United States Patent
Tateishi et al.

(10) Patent No.: US 8,072,866 B2
(45) Date of Patent: Dec. 6, 2011

(54) MARKER SELECTION METHOD FOR HOLOGRAM RECORDING DEVICE

(75) Inventors: Kiyoshi Tateishi, Saitama (JP);
Michikazu Hashimoto, Saitama (JP)

(73) Assignee: Pioneer Corporation, Tokyo (JP)

( * ) Notice: Subject to any disclaimer, the term of this patent is extended or adjusted under 35 U.S.C. 154(b) by 1022 days.

(21) Appl. No.: 11/885,406

(22) PCT Filed: Mar. 3, 2006

(86) PCT No.: PCT/JP2006/304057
§ 371 (c)(1),
(2), (4) Date: Aug. 30, 2007

(87) PCT Pub. No.: WO2006/093255
PCT Pub. Date: Sep. 8, 2006

(65) Prior Publication Data
US 2009/0238058 A1    Sep. 24, 2009

(30) Foreign Application Priority Data
Mar. 3, 2005  (JP) .................................. 2005-059479

(51) Int. Cl.
*G11B 7/00*    (2006.01)
(52) U.S. Cl. ........................................................ 369/103
(58) Field of Classification Search .................. 369/103, 369/100; 359/1–35; 430/1, 2
See application file for complete search history.

(56) References Cited

U.S. PATENT DOCUMENTS

| | | | |
|---|---|---|---|
| 5,475,209 A | 12/1995 | Nabeshima | |
| 5,504,596 A | 4/1996 | Goto et al. | |
| 5,920,536 A | 7/1999 | Campbell et al. | |
| 6,064,586 A * | 5/2000 | Snyder et al. | 365/125 |
| 6,233,083 B1 * | 5/2001 | Minagawa | 359/245 |
| 6,445,470 B1 | 9/2002 | Jenkins et al. | |
| 6,486,982 B1 | 11/2002 | Davis | |
| 6,538,740 B1 * | 3/2003 | Shiraishi et al. | 356/401 |
| 6,549,664 B1 * | 4/2003 | Daiber et al. | 359/1 |
| 6,728,008 B1 | 4/2004 | Kamisuwa | |

(Continued)

FOREIGN PATENT DOCUMENTS

JP    02-282981    11/1990

(Continued)

OTHER PUBLICATIONS

International Search Report mailed Jun. 13, 2006 (Japanese and English text).

*Primary Examiner* — Tan X Dinh
(74) *Attorney, Agent, or Firm* — Nixon & Vanderhye, P.C.

(57) ABSTRACT

A marker selection method includes: a marker generation step for generating a marker defining a position reference when recording data according to the modulation rule of the hologram recording/reproduction; a calculation step for calculating a correlation value indicating the correlation between a template image indicating a maker and each of a first verification image containing the marker shifted by a predetermined pixel and a second verification image containing data; and a selection step for selecting such a marker that the peak of the correlation value in the first verification image becomes greater than the peak of the correlation value in the second verification image. The selected marker is used as marker data in a marker generator in a recording processing circuit during recoding and as template data of the template matching processing circuit in the reproduction processing circuit during reproduction.

13 Claims, 15 Drawing Sheets

U.S. PATENT DOCUMENTS

| | | |
|---|---|---|
| 6,729,541 B1 | 5/2004 | Kurokawa |
| 7,002,891 B2 | 2/2006 | Horimai |
| 7,006,225 B2 | 2/2006 | Tanaka |
| 7,236,441 B2 | 6/2007 | Tanaka et al. |
| 7,248,389 B2 | 7/2007 | Toishi |
| 7,262,892 B1 | 8/2007 | Yasuda et al. |
| 7,321,541 B2 | 1/2008 | Horimai |
| 7,471,609 B2 | 12/2008 | Tateishi et al. |
| 7,492,692 B2 * | 2/2009 | Tateishi et al. ............... 369/103 |
| 7,672,209 B2 | 3/2010 | Tateishi et al. |
| 2002/0075776 A1* | 6/2002 | Kasazumi et al. ............ 369/103 |
| 2004/0037196 A1 | 2/2004 | Matsumoto et al. |
| 2004/0042374 A1 | 3/2004 | Horimai |
| 2005/0135217 A1 | 6/2005 | Tateishi et al. |
| 2005/0147013 A1 | 7/2005 | Tateishi et al. |
| 2005/0162719 A1 | 7/2005 | Ogasawara et al. |
| 2006/0033987 A1 | 2/2006 | Stelzer et al. |
| 2006/0077852 A1 | 4/2006 | Tateishi et al. |
| 2007/0115789 A1 | 5/2007 | Liedenbaum |
| 2007/0121185 A1 | 5/2007 | Tsukagoshi et al. |
| 2007/0247686 A1 | 10/2007 | Tateishi et al. |
| 2008/0166056 A1* | 7/2008 | Hashimoto et al. ........... 382/209 |
| 2010/0245955 A1* | 9/2010 | Yamakawa et al. ........... 359/31 |
| 2010/0265808 A1* | 10/2010 | Yamakawa et al. ........... 369/103 |

FOREIGN PATENT DOCUMENTS

| | | |
|---|---|---|
| JP | 08-335322 | 12/1996 |
| JP | 9-288309 | 11/1997 |
| JP | 11-16374 | 1/1999 |
| JP | 2002-063733 | 2/2000 |
| JP | 2000-122012 | 4/2000 |
| JP | 2000-268381 | 9/2000 |
| JP | 2000-284671 | 10/2000 |
| JP | 2001-075463 | 3/2001 |
| JP | 2001-273650 | 10/2001 |
| JP | 2002-123949 | 4/2002 |
| JP | 2003-092246 | 3/2003 |
| JP | 2004-139691 | 5/2004 |

* cited by examiner

[FIG. 1]
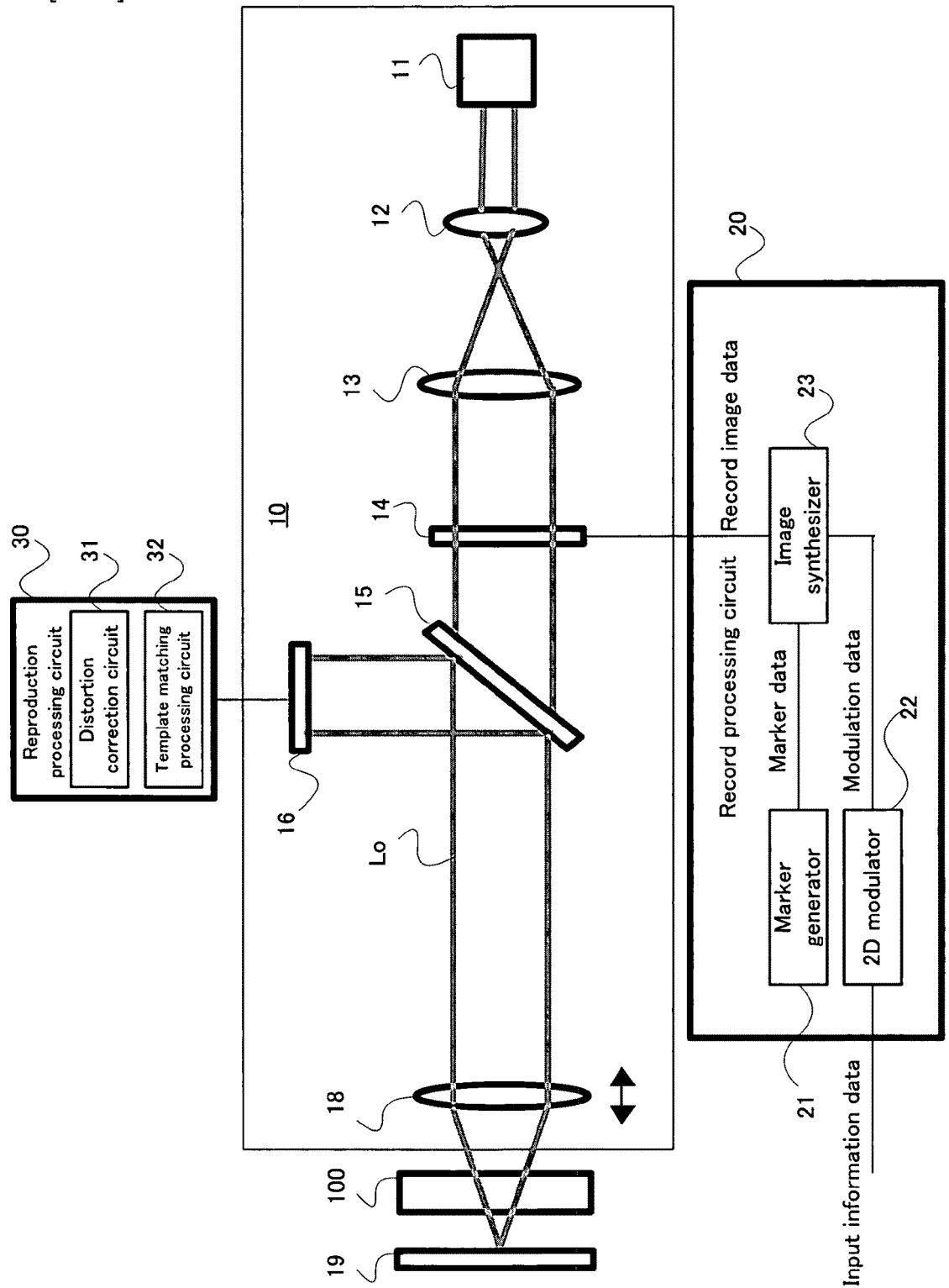

[FIG. 2]
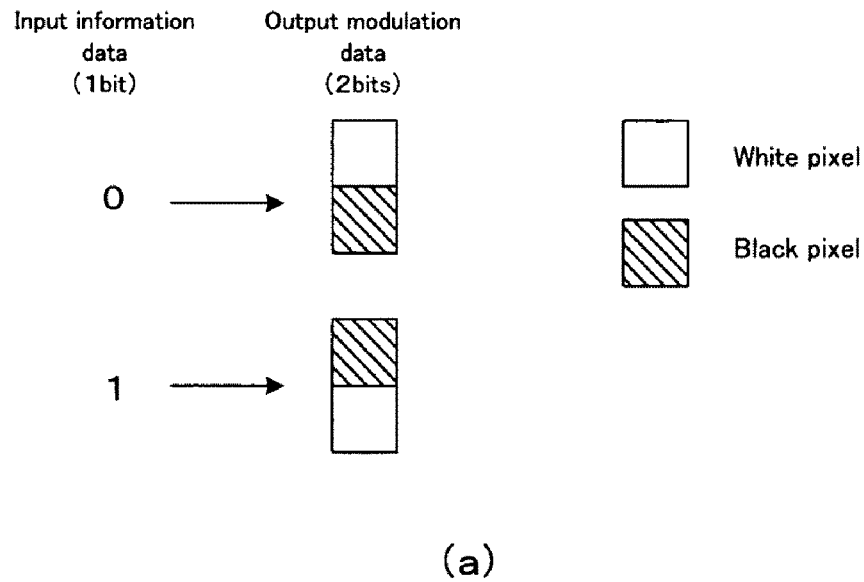
(a)
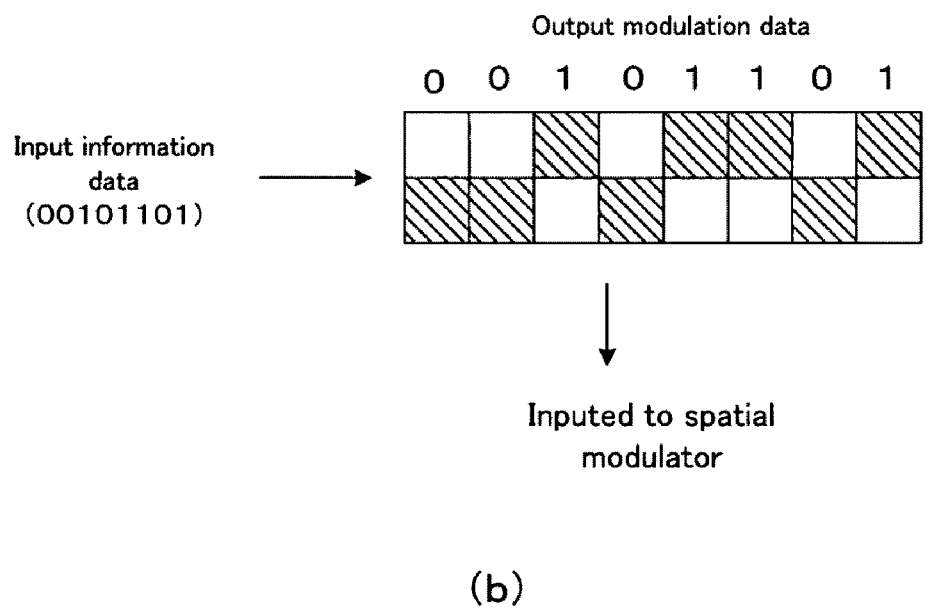
(b)

[FIG. 3]
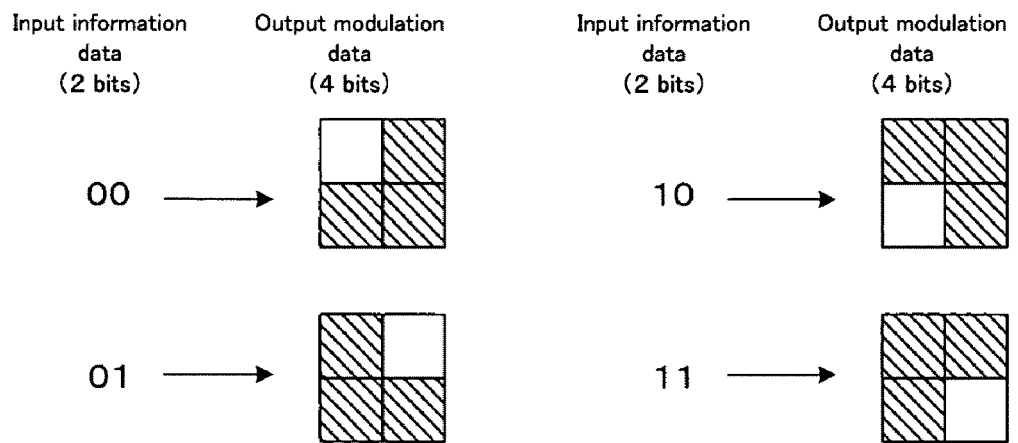
(a)
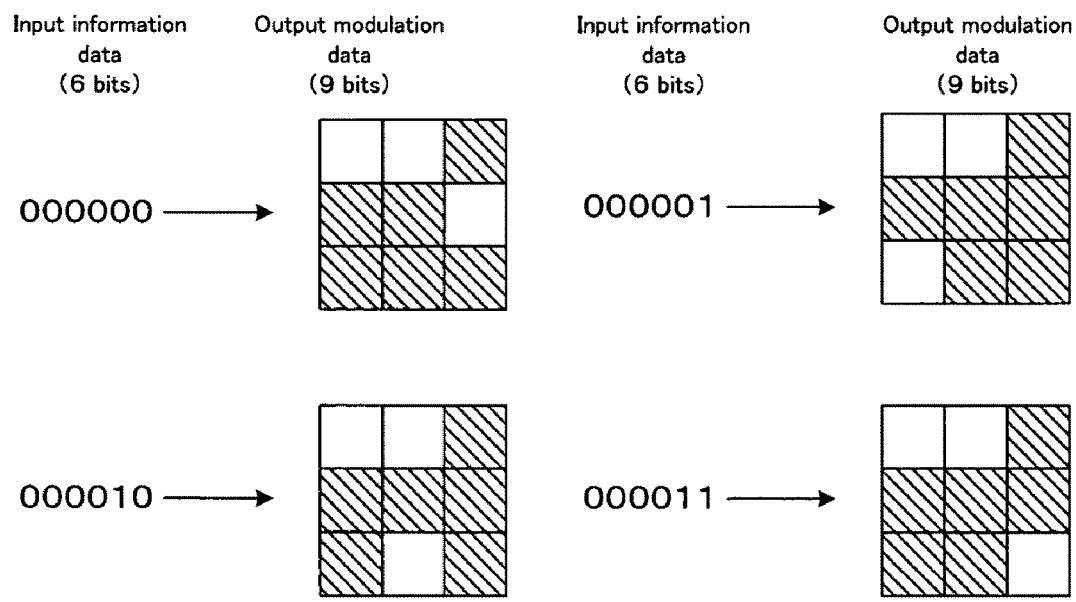
(b)

[FIG. 4]
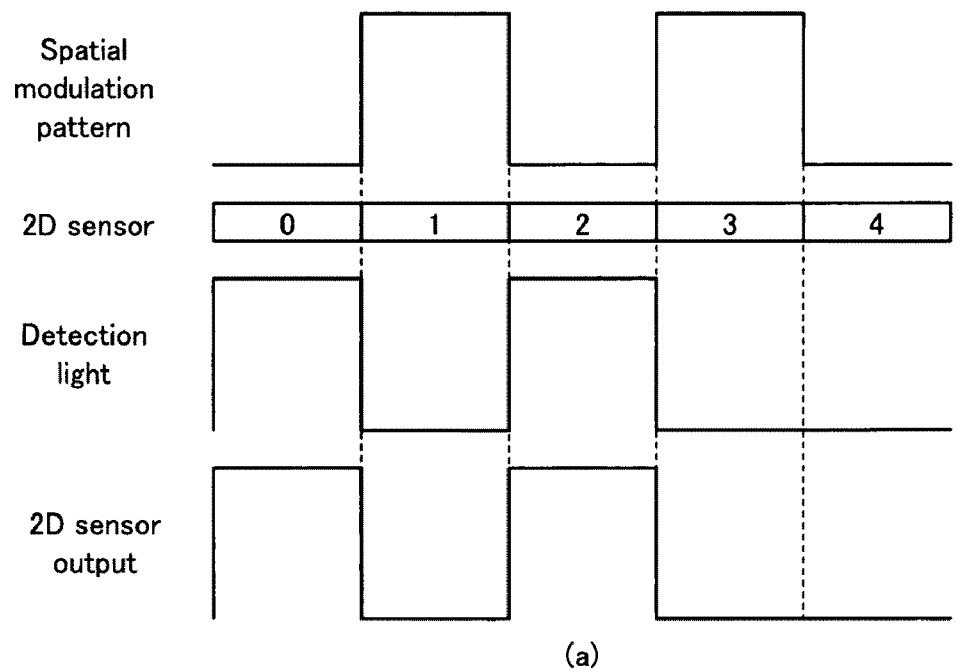
(a)
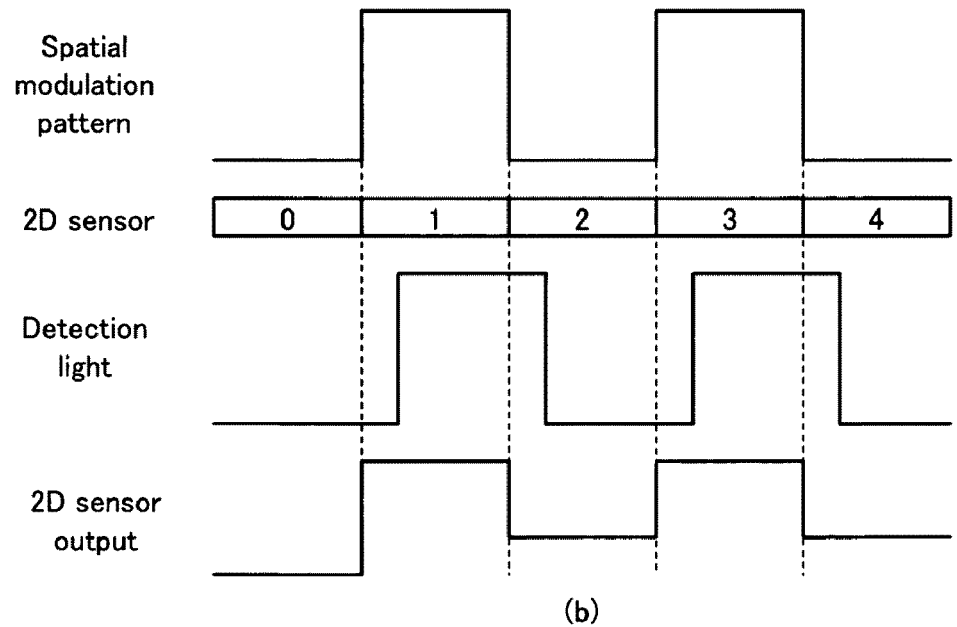
(b)

[FIG. 5]
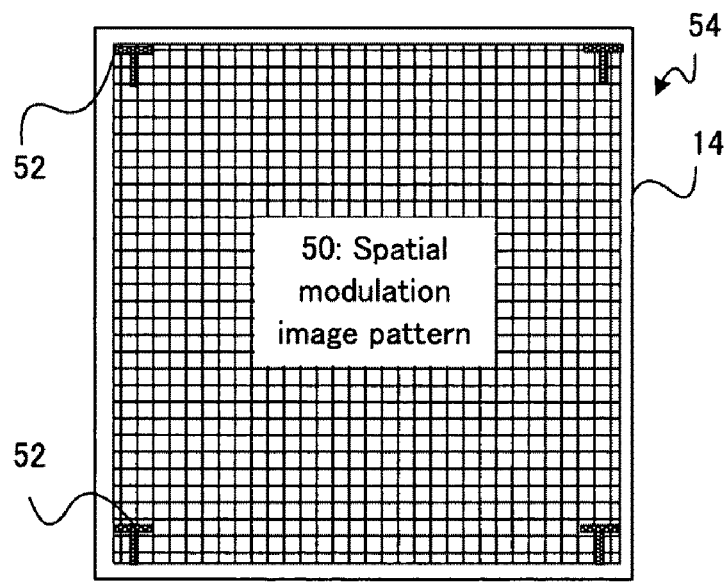
[FIG. 6]
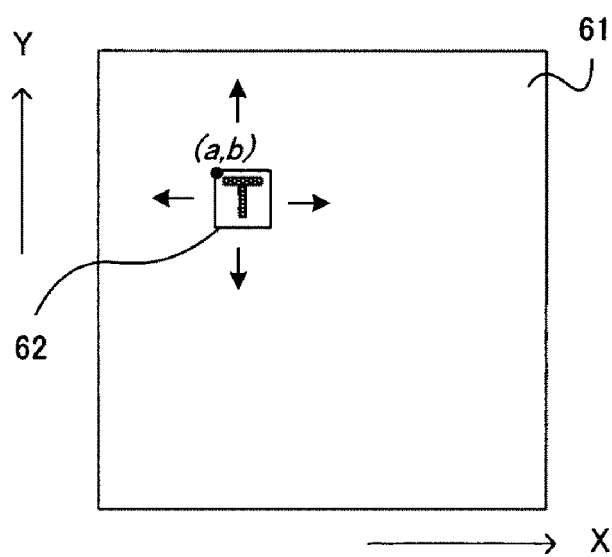

[FIG. 7]
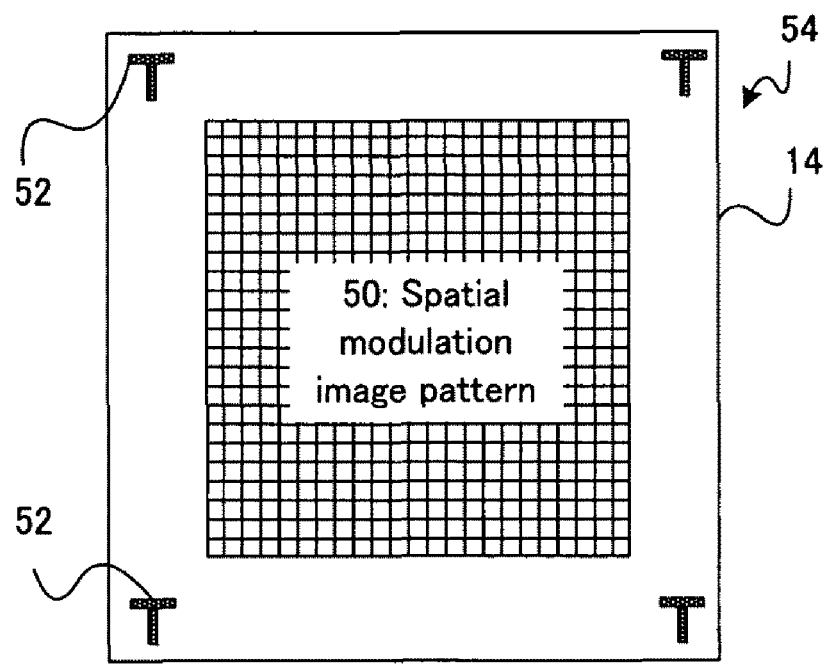

[FIG. 8]
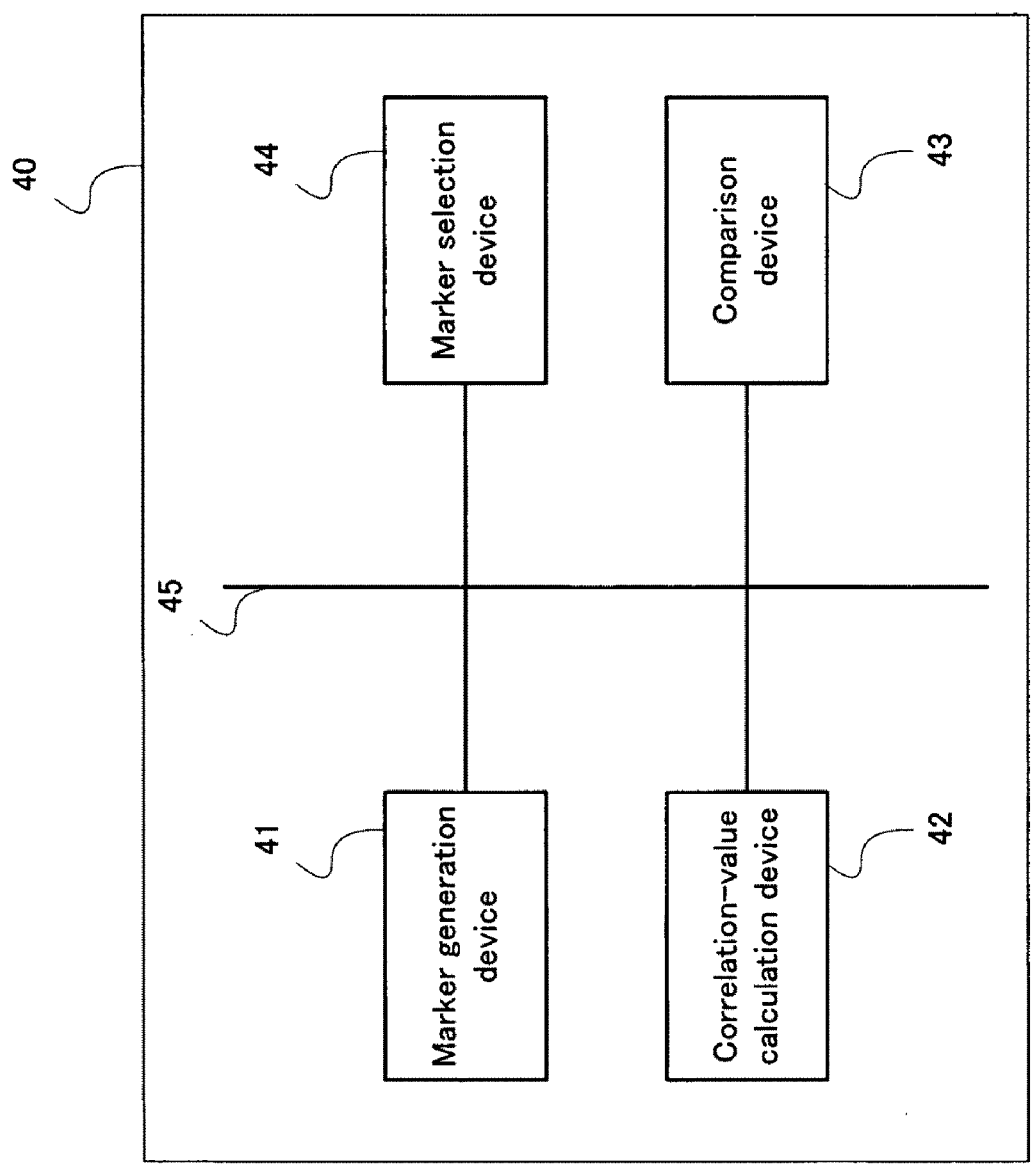

[FIG. 9]
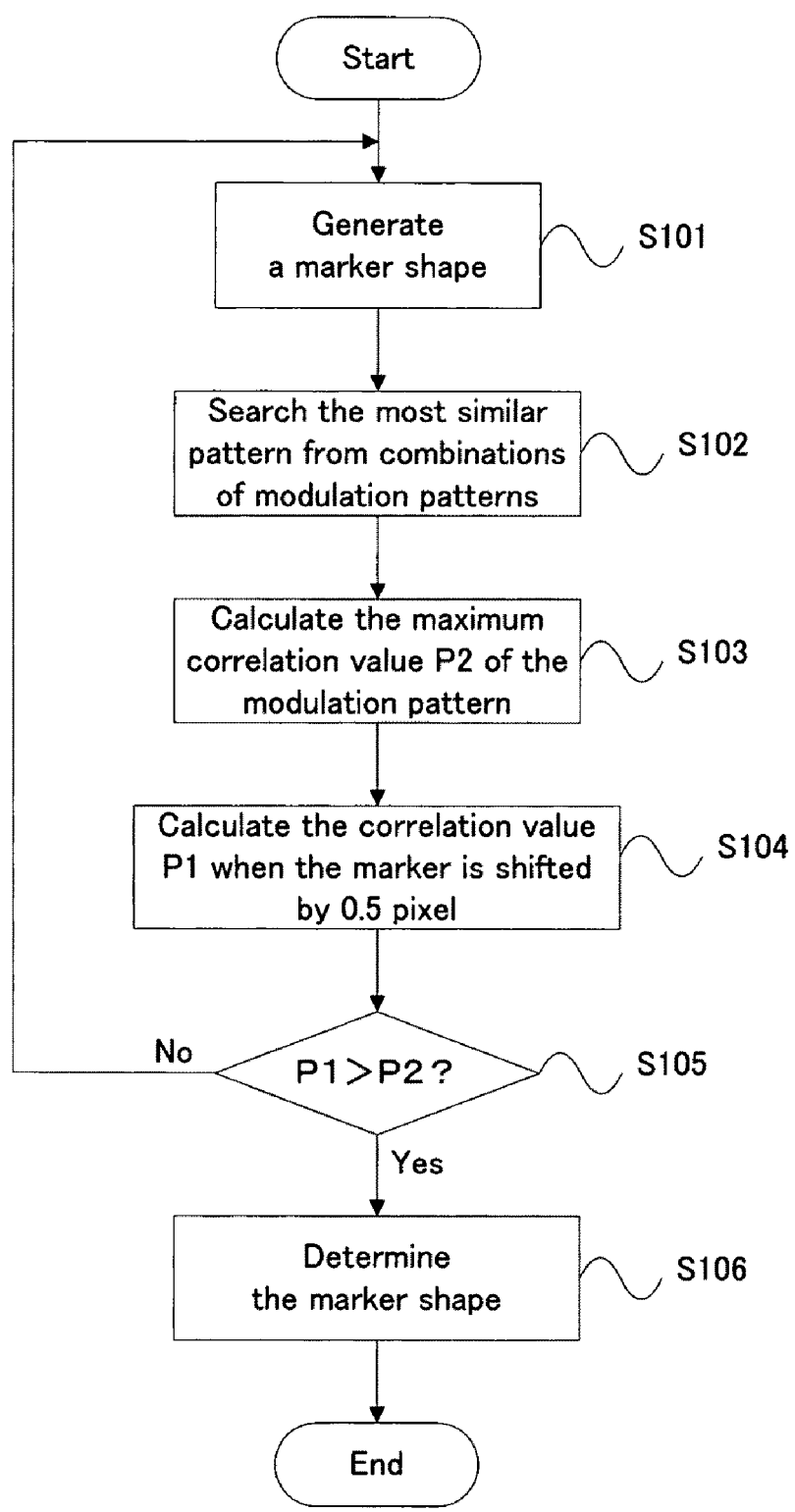

[FIG. 10]
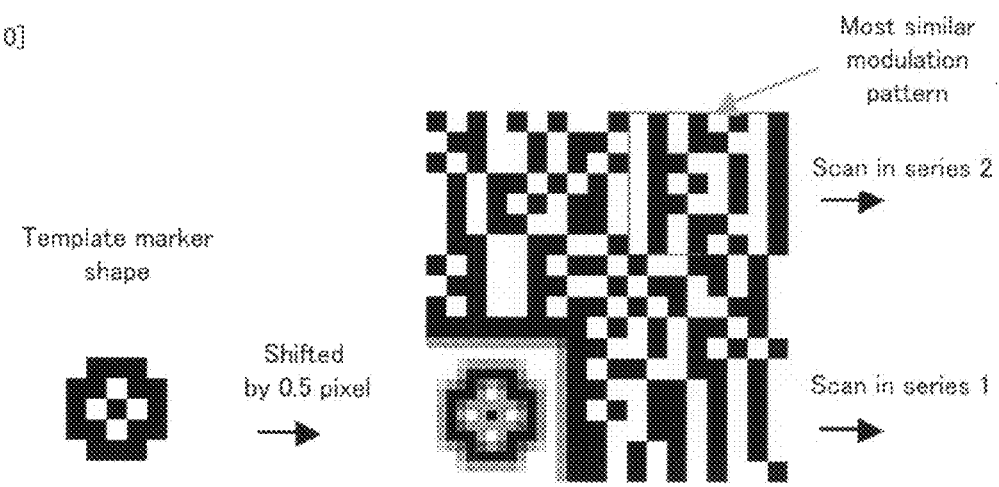
(a)
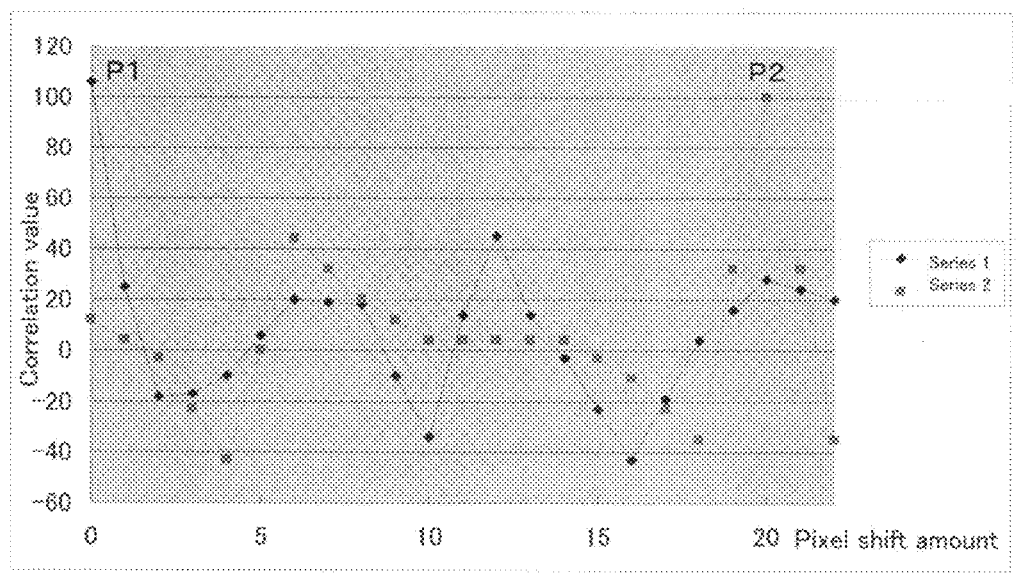
(b)

[FIG. 11]
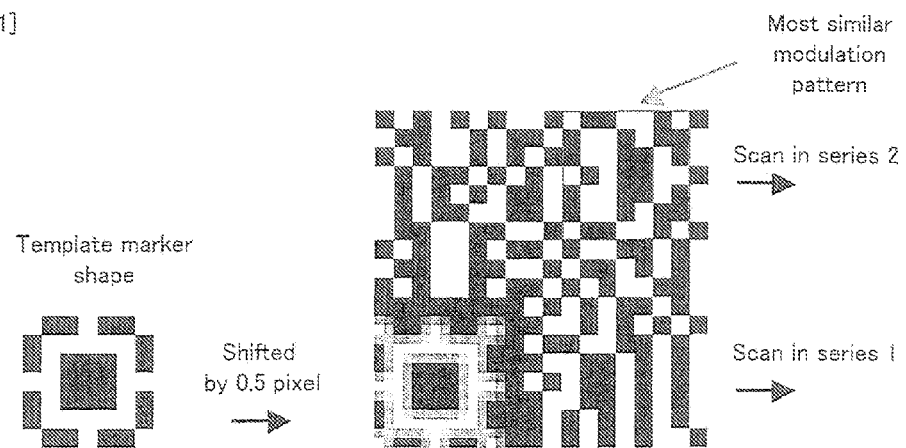
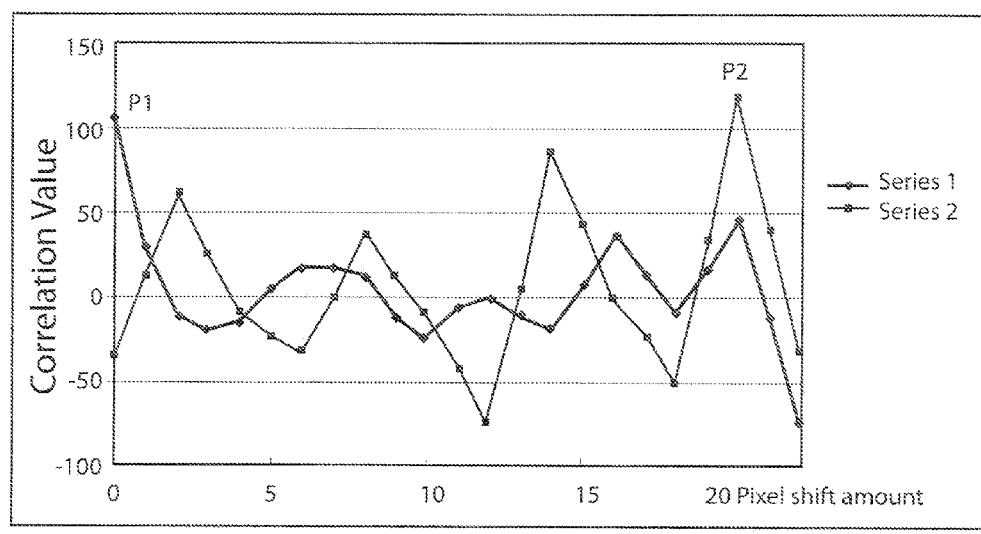
(b)

[FIG. 12]
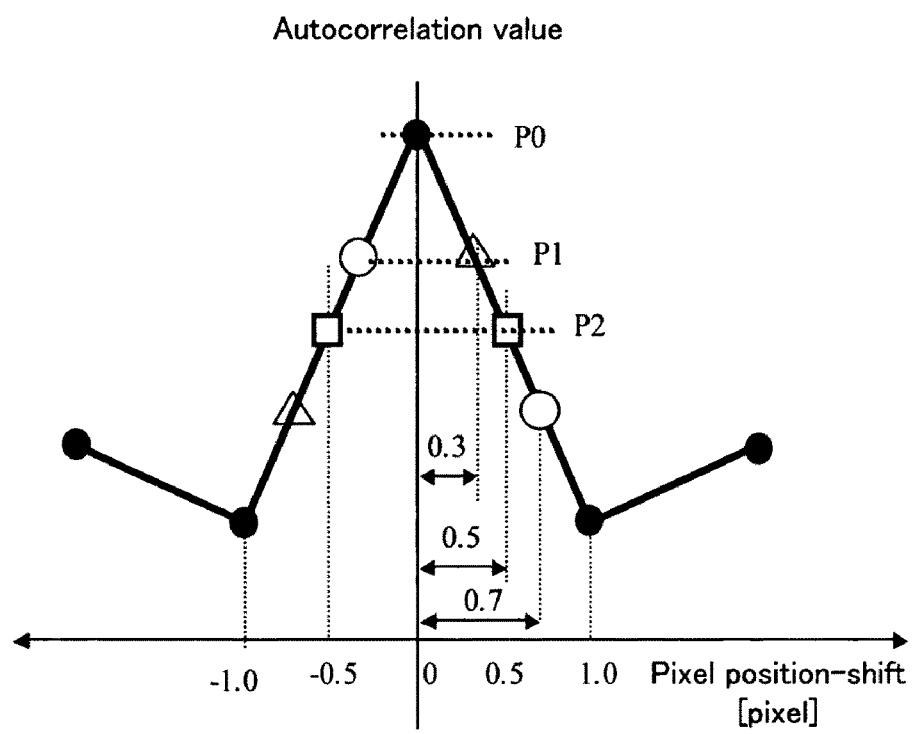

[FIG. 13]
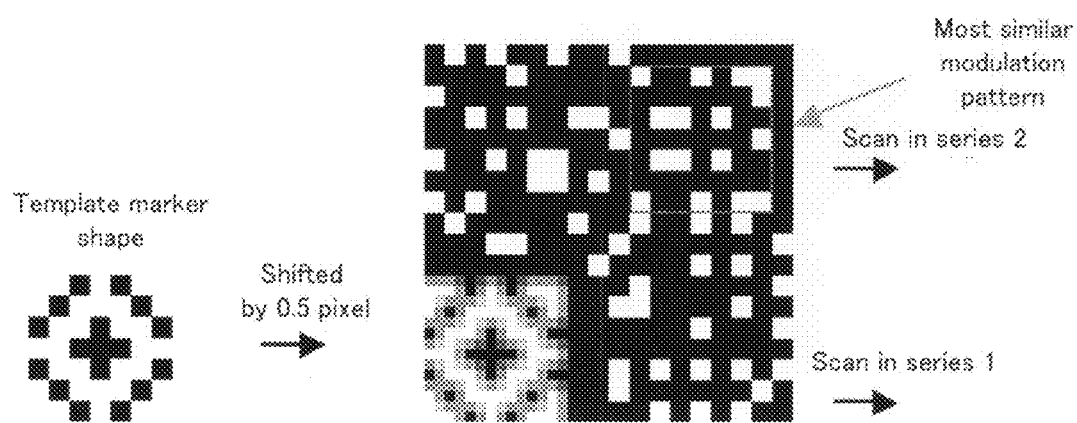
(a)
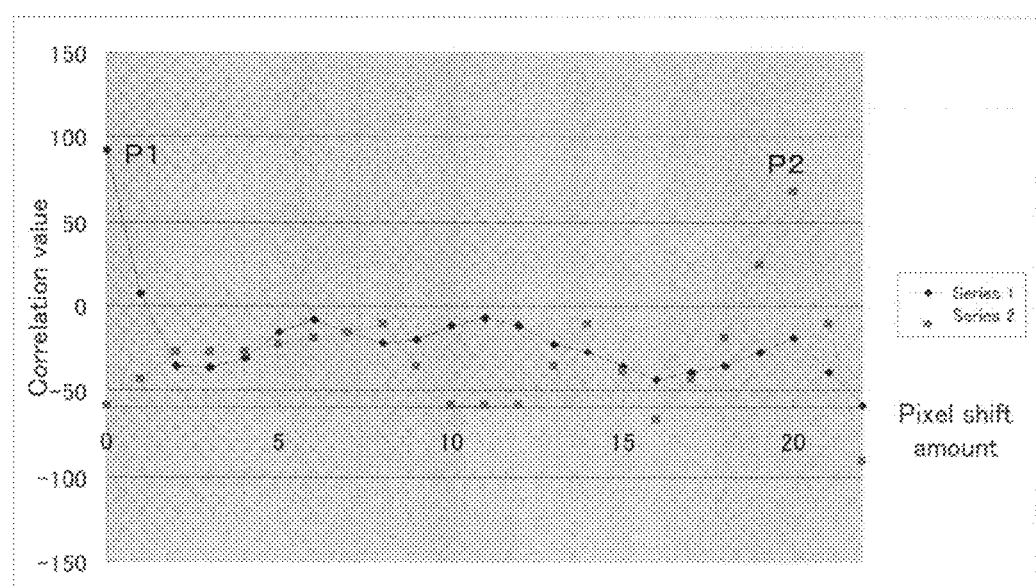
(b)

[FIG. 14]
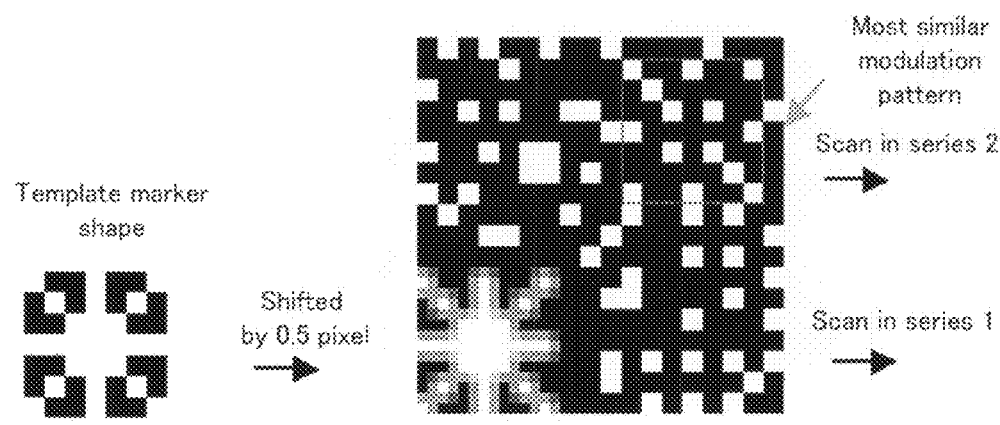
(a)
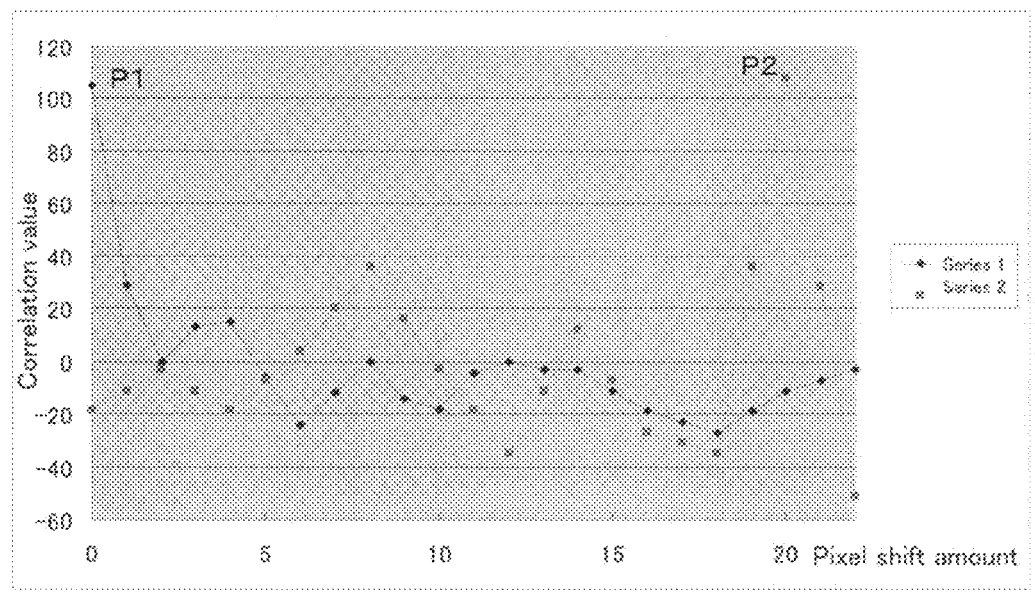
(b)

[FIG. 15]
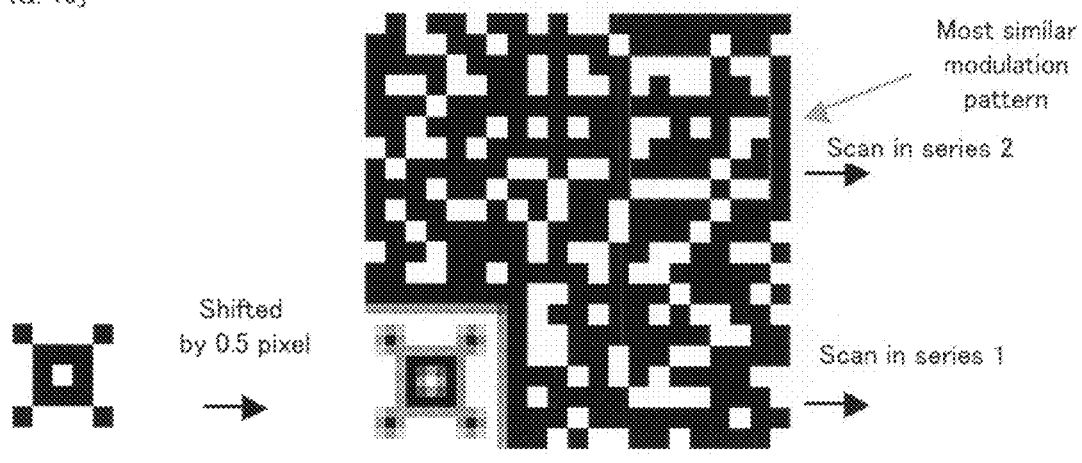
(a)
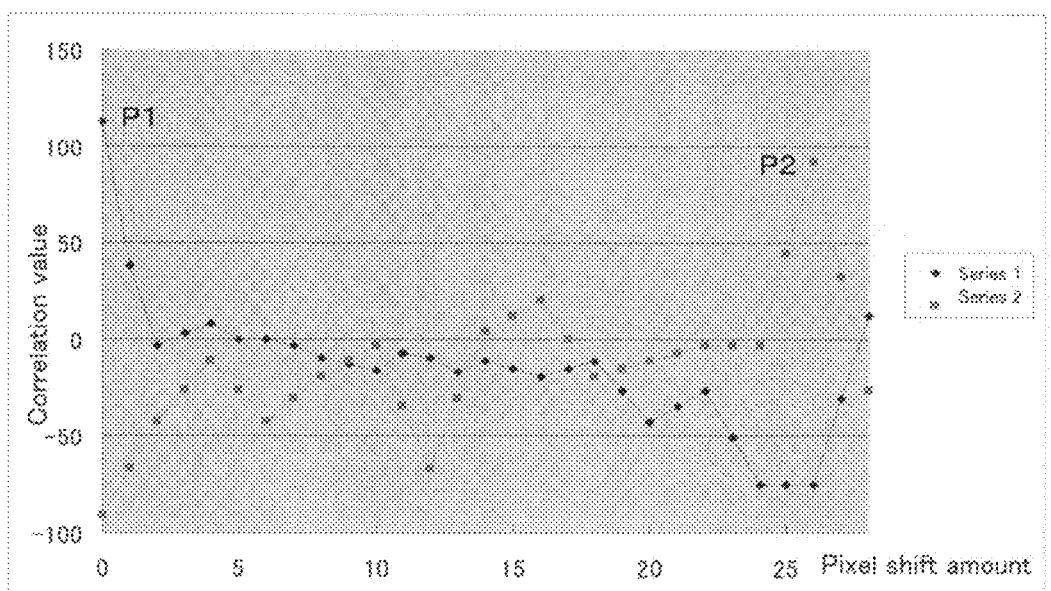
(b)

[FIG. 16]
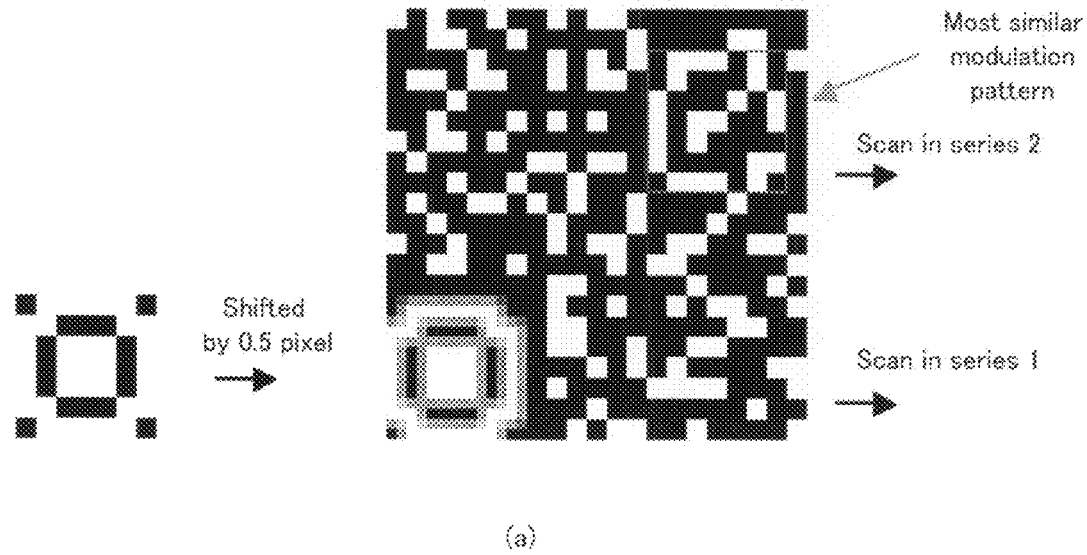
(a)
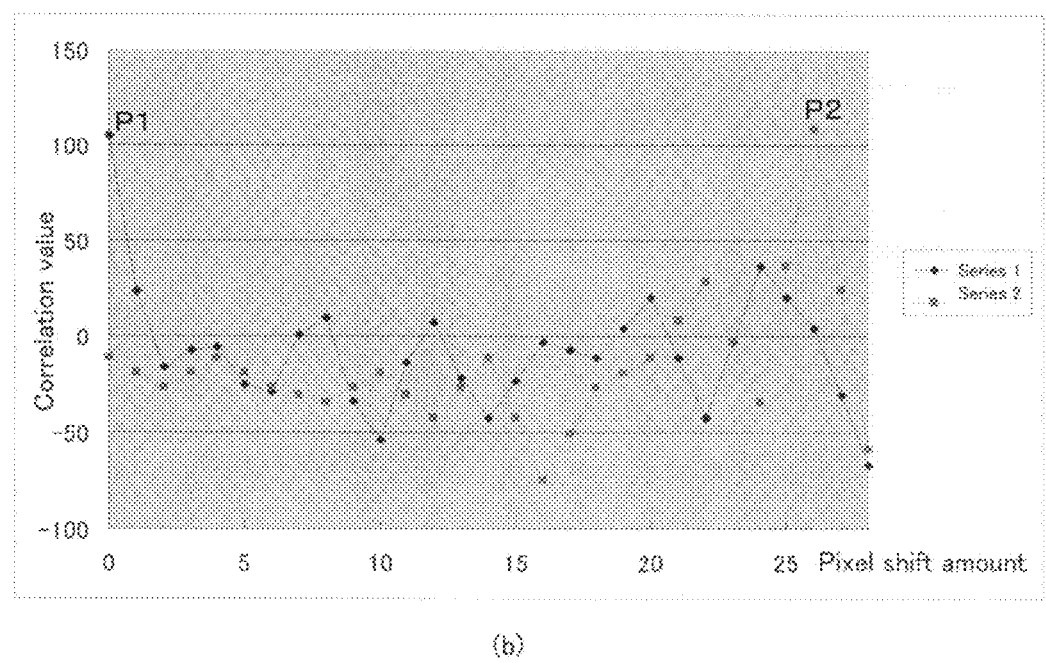
(b)

MARKER SELECTION METHOD FOR HOLOGRAM RECORDING DEVICE

This application is the U.S. national phase of International Application No. PCT/JP2006/304057 filed 3 Mar. 2006 which designated the U.S. and claims priority to JP 2005-059479 filed 3 Mar. 2005, the entire contents of each of which are hereby incorporated by reference.

TECHNICAL FIELD

The present invention relates to a marker selecting method of and apparatus for selecting a marker used in hologram recording/reproduction, a marker used in the hologram recording/reproduction, a hologram recording apparatus for and method of recording information onto a holographic recording medium, a hologram reproducing apparatus for and method of reproducing information from a holographic recording medium, and a computer program used for the hologram recording apparatus and the hologram reproducing apparatus described above.

BACKGROUND AND SUMMARY

There is known a hologram recording technique of recording information to be recorded into a holographic recording medium (hereinafter merely referred to as a "recording medium") as an interference pattern. One method is to spatial-modulate light from a light source in accordance with the information to be recorded, to thereby generate object light and then irradiate the recording medium with the object light and reference light. The object light and the reference light interfere with each other on the recording medium, to thereby form the interference pattern. The interference pattern is recorded into a recording layer of the recording medium as a record image. At this time, the record image is recorded on the recording medium, with a marker appended, wherein the marker is a position reference of the record image.

On the other hand, in reproduction, the portion of the recording medium in which the information is recorded is irradiated only with the reference light, and detection light from the recording medium is detected by a 2-dimentional (2D) sensor to reproduce the information. At this time, in order to detect the position of the reproduction image, template matching process is performed. In the template matching process, while a template image, which is the same as a marker, is shifted by one pixel each time throughout the entire candidate area out of the reproduced record image (i.e. a reproduction image), a correlation value between the template image and the reproduction image is calculated in each position, to thereby obtain a coordinate position with the maximum correlation value.

A patent document 1 discloses the basic principle of the hologram recording technology and particularly discloses an information modulating method. Moreover, a patent document 2 discloses a marker for alignment on a semiconductor exposure apparatus, wherein the marker includes a black line whose surroundings are white or white and black stripe lines. Moreover, a patent document 3 discloses that markers made of white square pixels are appended to the four corners of a record image.

Patent document 1: Japanese Patent Application Laid Open NO. 2001-75463
Patent document 2: Japanese Patent Application Laid Open NO. 2003-92246
Patent document 3: Japanese Patent Application Laid Open NO. 2000-122012

However, if the marker appended to the record image and the original information data included in the record image are not clearly distinguished, the correlation value possibly becomes maximal in a portion where the marker is not displaced, in the template matching process. In this case, the accurate position of the marker cannot be detected, and thus the position of the record image cannot be detected.

For this reason, the following countermeasure is considered; namely, a spatial space is provided between the marker appended to the record image and the original information data included in the record image, to thereby clearly divide the marker and the original information data. However, there is such a technical problem that the space for division becomes a useless area, resulting in a reduction in a recording capacity for recording the data.

The subject to be solved by the invention includes the aforementioned problem as one example. It is therefore an object of the present invention to provide a method of and apparatus for intentionally selecting a marker which can be clearly distinguished from information data in a record image, a marker selected by such a marker selecting method, a hologram recording apparatus for and method of selecting such a marker in advance to use, a hologram reproducing apparatus for and method of using such marker, and a computer program for executing a computer.

The above object of the present invention can be achieved by a marker selecting method provided with: a two-dimensional modulating process of modulating information data in a two-dimensional manner in accordance with a specified modulation rule, to thereby obtain modulation data, in hologram recording/reproduction; a marker generating process of generating a first marker in accordance with the modulation rule, the first marker defining a position reference for correcting a position-shift of the modulation data in a recording/reproducing procedure; a calculating process of preparing a first verification image and a second verification image and of calculating a correlation value which indicates a correlation between a template image and the first verification image and a correlation value which indicates a correlation between the template image and the second verification image, the first verification image including a second marker obtained by shifting the first marker by a predetermined pixel, the second verification image including the modulation data, the template image indicating the first marker; and a selecting process of selecting the first marker by which a peak of the correlation value in the first verification image is greater than a peak of the correlation value in the second verification image.

According to the marker selecting method of the present invention, the first marker is generated by the operation of the marker generating device. The first marker is used for, for example, template matching process and to detect the position of a record image including the information data. The marker generating device generates the marker in accordance with the modulation rule in the hologram recording/reproduction.

In particular, in the present invention, the correlation value which indicates the correlation between the first verification image and the template image is calculated by the operation of the marker generating device, wherein the first verification image includes the second marker obtained by shifting the first marker by the predetermined pixel and the template image indicates the first marker. The first verification image includes not the image of the first marker itself but the image of the second marker, which is shifted by the predetermined pixel in a longitudinal direction, a lateral direction, or the like. Therefore, the first verification image includes the second marker whose positional relationship with the template image which is used in the calculation of the correlation value is shifted by the predetermined pixel. Then, the correlation value which indicates the correlation between the template image and the second verification image is calculated, wherein the second verification image includes arbitrary information data, which is used for actual recording. After that, the first marker is intentionally selected such that the peak of the correlation value in the first verification image is greater than the peak of the correlation value in the second verification image. The selected first marker is used in the actual recording operation or reproduction operation. In short, in the actual recording operation or reproduction operation, a marker image indicating the selected first marker is generated and recorded onto a hologram recording medium as record image data together with the modulation data, which includes the information data, by the operation of a two-dimensional (2D) modulating device. In the reproduction, the generated marker image is used as the template image and is used to detect a reference position for correcting an image distortion in the recording/reproducing procedure.

As described above, the marker is intentionally selected by the selecting device such that the peak of the correlation value in the first verification image is greater than the peak of the correlation value in the second verification image. In other words, the marker to which the first verification image is more similar than an image portion in the second verification image including the information data which is most similar to the marker is selected. In particular, since the first verification image includes the second marker shifted by the predetermined pixel, its correlation value is obviously lower than the correlation value of the first maker which originally has no pixel-shift. Even if such a position-shift which results in the lower correlation value is intentionally assumed, the marker which has the higher correlation value in the position where the original marker exists is selected, compared to the correlation value in the image portion which is most similar to the marker in the second verification image including the modulation data. The marker may be selected by a hologram recording apparatus or a hologram reproducing apparatus. Alternatively, the marker may be selected in advance, separately. Therefore, in the actual hologram recording or reproduction, it is possible to clearly distinguish the marker image and the record image including the modulation data obtained by 2D-modulating the information data. By this, it is no longer necessary to separate the marker image and the record image including the information data with a spatial space provided, to thereby preferably ensure the recording capacity for recording the information data. That is, the recording capacity of the holographic recording medium can be efficiently used.

In one aspect of the marker selecting method of the present invention, a similar pattern which is similar to the first marker is disposed at least one portion of the second verification image, and the selecting process selects the first marker by which the peak of the correlation value in the first verification image is greater than the peak of the correlation value in the portion of the second verification image in which the similar pattern is disposed.

According to this aspect, the marker that allows a clear distinction between the marker image and the record image including the information data is preferably selected. Therefore, it is possible to preferably receive the aforementioned various benefits.

In this aspect, if the modulation rule is different, a different pattern may be also generated for the similar pattern.

By virtue of such construction, the similar pattern can be preferably disposed in the second verification image in accordance with the modulation rule.

In another aspect of the marker selecting method of the present invention, the first verification image includes the second marker obtained by shifting the first marker by 0.5 pixel, as the predetermined pixel.

According to this aspect, as explained later in detail in an embodiment by using the drawings, the correlation value in the first verification image can be intentionally reduced. Even in this case, the selected marker realizes that the peak of the correlation value in the first verification image is greater than the peak of the correlation value in the second verification image. Therefore, the marker that allows the clear distinction between the marker image and the record image including the information data is selected. Therefore, it is possible to preferably receive the aforementioned various benefits.

In another aspect of the marker selecting method of the present invention, the first verification image includes the second marker shifted by the predetermined pixel on the basis of a pixel unit on a light receiving element used when the modulation data is reproduced.

According to this aspect, the marker is selected in view of the light receiving element mounted on the hologram recording apparatus or hologram reproducing apparatus.

In another aspect of the marker selecting method of the present invention, the first verification image includes the first marker shifted by the predetermined pixel in each of a longitudinal direction and a lateral direction.

According to this aspect, the marker that allows the clear distinction between the marker image and the record image including the information data is preferably selected. Therefore, it is possible to preferably receive the aforementioned various benefits.

The above object of the present invention can be also achieved by a marker selecting apparatus provided with: a two-dimensional modulating device for modulating information data in a two-dimensional manner in accordance with a specified modulation rule, to thereby obtain modulation data, in hologram recording/reproduction; a marker generating device for generating a first marker in accordance with the modulation rule, the first marker defining a position reference for correcting a position-shift of the modulation data in a recording/reproducing procedure; a calculating device for preparing a first verification image and a second verification image and of calculating a correlation value which indicates a correlation between a template image and the first verification image and a correlation value which indicates a correlation between the template image and the second verification image, the first verification image including a second marker obtained by shifting the first marker by a predetermined pixel, the second verification image including the modulation data, the template image indicating the first marker; and a selecting device for selecting the first marker by which a peak of the correlation value in the first verification image is greater than a peak of the correlation value in the second verification image.

According to the marker selecting apparatus of the present invention, it is possible to receive the same various benefits as those of the marker selecting method of the present invention.

Incidentally, in response to the various aspects owned by the aforementioned marker selecting method of the present invention, the marker selecting apparatus of the present invention can also adopt various aspects.

The above object of the present invention can be also achieved by a marker for defining a position reference when information data is recorded in accordance with a modulation rule in hologram recording/reproduction, wherein a peak of a correlation value which indicates a correlation between a first verification image and a template image is greater than a peak of a correlation value which indicates a correlation between a second verification image and the template image, the first verification image including the marker shifted by a predetermined pixel, the template image indicating the marker, the second verification image including the record information. That is, the marker of the present invention is a marker selected by the marker selecting method of the present invention (including its various aspects).

According to the marker of the present invention, it is possible to receive the same various benefits as those of the marker selecting method of the present invention.

Incidentally, in response to the various aspects owned by the aforementioned marker selecting method of the present invention, the marker of the present invention can also adopt various aspects.

The above object of the present invention can be also achieved by a hologram recording apparatus provided with: an appending device for appending a marker selected by the aforementioned marker selecting method of the present invention (including its various aspects) to a record image including the information data; and a recording device for recording the record image to which the marker is appended, onto a holographic recording medium.

According to the hologram recording apparatus of the present invention, it is possible to append the marker (or marker image) that allows the clear distinction from the record image including the information data, to the record image. Therefore, it is possible to preferably receive the aforementioned various benefits.

Incidentally, in response to the various aspects owned by the aforementioned marker selecting method of the present invention, the hologram recording apparatus of the present invention can also adopt various aspects.

The above object of the present invention can be also achieved by a hologram recording method provided with: an appending process of appending a marker selected by the aforementioned marker selecting method of the present invention (including its various aspects) to a record image including the information data; and a recording process of recording the record image to which the marker is appended, onto a holographic recording medium.

According to the hologram recording method of the present invention, it is possible to receive the same various benefits as those of the hologram recording apparatus of the present invention.

Incidentally, in response to the various aspects owned by the aforementioned hologram recording apparatus of the present invention, the hologram recording method of the present invention can also adopt various aspects.

The above object of the present invention can be also achieved by a hologram reproducing apparatus provided with: a processing device for performing template matching process with respect to a record image including the information data recorded on a graphic recording medium by using a marker selected by the aforementioned marker selecting method of the present invention (including its various aspects); and a reproducing device for reproducing the information data included in the record image.

According to the hologram reproducing apparatus of the present invention, the marker (or marker image) and the record image including the information data can be clearly distinguished in the template matching. Therefore, it is possible to preferably receive the aforementioned various benefits.

Incidentally, in response to the various aspects owned by the aforementioned marker selecting method of the present invention, the hologram reproducing apparatus of the present invention can also adopt various aspects.

The above object of the present invention can be also achieved by a hologram reproducing method provided with: a processing process of performing template matching process with respect to a record image including the information data recorded on a graphic recording medium by using a marker selected by the aforementioned marker selecting method of the present invention (including its various aspects); and a reproducing process of reproducing the information data included in the record image.

According to the hologram reproducing method of the present invention, it is possible to receive the same various benefits as those of the hologram reproducing apparatus of the present invention.

Incidentally, in response to the various aspects owned by the aforementioned hologram reproducing apparatus of the present invention, the hologram reproducing method of the present invention can also adopt various aspects.

The above object of the present invention can be also achieved by a first computer program for hologram recording control to control a computer provided in the aforementioned hologram recording apparatus of the present invention (including its various aspects), the computer program making the computer function as at least one portion of the appending device and the recording device. Moreover, the above object of the present invention can be also achieved by a second computer program for hologram reproduction control to control a computer provided in the aforementioned hologram reproducing apparatus of the present invention (including its various aspects), the computer program making the computer function as at least one portion of the processing device and the reproducing device.

According to each of the computer programs of the present invention, the above-mentioned hologram recording apparatus or hologram reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned hologram recording apparatus or hologram reproducing apparatus of the present invention, each of the computer programs of the present invention can also adopt various aspects.

The above object of the present invention can be also achieved by a first computer program product in a computer-readable medium for tangibly embodying a program of instructions executable by a computer provided in the aforementioned hologram recording apparatus of the present invention (including its various aspects), the computer program product making the computer function as at least one portion of the appending device and the recording device. The above object of the present invention can be also achieved by a second computer program product in a computer-readable medium for tangibly embodying a program of instructions executable by a computer provided in the aforementioned hologram reproducing apparatus of the present invention (including its various aspects), the computer program product making the computer function as at least one portion of the processing device and the reproducing device.

According to each of the computer program products of the present invention, the aforementioned hologram recording apparatus or hologram reproducing apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned hologram recording apparatus or hologram reproducing apparatus of the present invention.

These effects and other advantages of the present invention will become more apparent from the embodiment explained below.

As explained above, according to the marker selecting method of the present invention, it is provided with the marker generating process, the calculating process, and the selecting process. According to the marker selecting apparatus of the present invention, it is provided with the marker generating device, the calculating device, and the selecting device. Therefore, the mark that allows the clear distinction between the marker image and the record image including the information data is preferably selected.

Moreover, according to the marker of the present invention, the peak of the correlation value in the first verification image is greater than the peak of the correlation value in the second verification image. Therefore, the marker image and the record image including the information data can be clearly distinguished.

Moreover, according to the hologram recording apparatus of the present invention, it is provided with the appending device and the recording device. According to the hologram recording method of the present invention, it is provided with the appending process and the recording process. Therefore, the marker image and the record image including the information data can be clearly distinguished.

Moreover, according to the hologram reproducing apparatus of the present invention, it is provided with the processing device and the reproducing device. According to the hologram reproducing method of the present invention, it is provided with the processing process and the reproducing process. Therefore, the marker image and the record image including the information data can be clearly distinguished.

BRIEF DESCRIPTION OF DRAWINGS

FIG. 1 is a view showing the basic structure of a hologram recording/reproducing apparatus in an embodiment of the present invention.

FIG. 2 are views showing one example of a 2-dimentional digital modulation method of modulating record data.

FIG. 3 are views showing another example of the 2-dimentional digital modulation method of modulating the record data.

FIG. 4 is a timing chart conceptually describing a signal waveform when the record data is reproduced and its timing in association with an imaging sensor in a pickup.

FIG. 5 is a view showing one example of a spatial modulation image pattern including markers.

FIG. 6 is a plan view conceptually showing a relationship between a template image and a reproduction image when a correlation value is calculated.

FIG. 7 is a view showing another example of the spatial modulation image pattern including markers.

FIG. 8 is a block diagram conceptually showing the basic structure of a marker selecting process.

FIG. 9 is a flowchart showing the outline of the operation principle of the marker selecting process.

FIG. 10 are a plan view showing one specific example of the shape of the marker according to a 1:2 modulation method and a graph showing the correlation value calculated by the marker.

FIG. 11 are a plan view showing another specific example of the marker shape according to the 1:2 modulation method and a graph showing the correlation value calculated by the marker.

FIG. 12 is a graph showing the autocorrelation value of the marker.

FIG. 13 are a plan view showing one specific example of the shape of the marker according to a 2:4 modulation method and a graph showing the correlation value calculated by the marker.

FIG. 14 are a plan view showing another specific example of the marker shape according to the 2:4 modulation method and a graph showing the correlation value calculated by the marker.

FIG. 15 are a plan view showing one specific example of the shape of the marker according to a 6:9 modulation method and a graph showing the correlation value calculated by the marker.

FIG. 16 are a plan view showing another specific example of the marker shape according to the 6:9 modulation method and a graph showing the correlation value calculated by the marker.

DESCRIPTION OF REFERENCE CODES

1 holographic recording/reproducing apparatus
10 pickup
20 record processing circuit
30 reproduction processing circuit
31 distortion correction circuit
32 template processing circuit
40 marker selection device
41 marker generation device
42 correlation-value calculation device
43 comparison device
44 marker selection device

DETAILED DESCRIPTION

Hereinafter, the best mode for carrying out the present invention will be explained in each embodiment in order with reference to the drawings.

(Hologram Recording/Reproducing Apparatus)

Firstly, with reference to FIG. 1 to FIG. 7, the basic structure and the basic operation principle of a hologram recording/reproducing apparatus in this embodiment will be explained. FIG. 1 shows the basic structure of the hologram recording/reproducing apparatus in the embodiment. Each of FIG. 2 and FIG. 3 shows one example of a 2-dimentional digital modulation method of modulating record data. FIG. 4 is a timing chart conceptually describing a signal waveform when the record data is reproduced and its timing in association with an imaging sensor in a pickup. FIG. 5 shows one example of a spatial modulation image pattern including markers. FIG. 6 is a plan view conceptually showing a relationship between a template image and a reproduction image when a correlation value is calculated. FIG. 7 shows another example of the spatial modulation image pattern including markers.

As shown in FIG. 1, a hologram recording/reproducing apparatus 1 is provided with: a pickup 10; a record processing circuit 20, which constitutes one specific example of the "recording device" and the "appending device" of the present invention; and a reproduction processing circuit 30, which constitutes one specific example of the "reproducing device" and the "processing device" of the present invention.

The pickup 10 is provided with a recording/reproduction laser 11 which generates laser light for data recording or reproduction.

In the recording, a light beam Lo emitted from the recording/reproduction laser 11 is inputted to a spatial modulator 14, with its beam diameter expanded by a beam expander, which is formed of lenses 12 and 13. The spatial modulator 14 can be formed of, for example, a liquid crystal element, and it has a plurality of pixels arranged in a lattice pattern.

Record image data inputted to the spatial modulator 14 will be explained by using a specific example of the record processing circuit 20 shown in the lower part of FIG. 1. The input information data to be recorded is two-dimension (2D)-digital-modulated by a 2D modulator 22 to thereby generate 2D-modulation data. Then, the 2D modulator 22 inputs the generated 2D-modulation data to one terminal of an image synthesizer 23. Moreover, a marker generator 21 generates marker data for position detection on the basis of a marker selected in advance and inputs it to the other terminal of the image synthesizer 23. The image synthesizer 23 arranges and synthesizes the modulation data and the marker data in accordance with a specified rule, to thereby obtain the record image data. The record image data has a pattern with white pixels and black pixels. The pattern is used to spatial-modulate the light beam.

FIG. 2 show one example of the 2D digital modulation performed by the spatial modulator 14. In this example, as shown in FIG. 2(a), the digital record image data outputted from the record processing circuit 20, namely "0" and "1" in the input data to be recorded into a recording medium 100, are expressed by the combination of the white pixel and the black pixel. The vertical arrangement of the white pixel and the black pixel in this order corresponds to the input data "0", and the vertical arrangement of the black pixel and the white pixel in this order corresponds to the input data "1". This example is referred to as 1:2 difference modulation because 1-bit input data is converted to 2-bit 2D modulation data.

FIG. 2(b) shows the 2D modulation data, which is obtained by 2D digital-modulating input information data of "00101101" in this modulation method, as output modulation data. That is, the output modulation data is synthesized with the marker data and is displayed on the spatial modulator 14, as the white pixel and the black pixel. Incidentally, the spatial modulator 14 is driven to generate the white pixel portion and the black pixel portion under the control of the record processing circuit 20, and it converts the input data to a 2D modulation image pattern. The light beam Lo which enters the spatial modulator 14 is transmitted through the white pixel portion of the spatial modulation image pattern and is blocked in the black pixel portion of the spatial modulation image pattern. Thus, the light beam Lo optically modulated by the spatial modulation image pattern is emitted from the spatial modulator 14.

Incidentally, the aforementioned example is one example of the spatial-modulation, and the application of the present invention is not necessarily limited to the aforementioned modulation method.

For example, as shown in FIG. 3(a), it may be a method of converting 2-bit input information data to 4-bit 2D modulation data, i.e. a so-called 2:4 modulation method. In the 2:4 modulation method, for example, a 2D modulation image pattern in which only the upper left pixel of a 2×2 matrix pixels is white corresponds to input data of "00", a 2D modulation image pattern in which only the upper right pixel is white corresponds to input data of "01", a 2D modulation image pattern in which only the lower left pixel is white corresponds to input data of "10", and a 2D modulation image pattern in which only the lower right pixel is white corresponds to input data of "11".

Alternatively, as shown in FIG. 3(b), it may be a method of converting 6-bit input information data to 9-bit 2D modulation data, i.e. a so-called 6:9 modulation method. In the 6:9 modulation method, 6-bit input data is expressed, depending on the positions of three white pixels, on a 3×3 matrix pixels.

Alternatively, any 2D digital modulation method may be used if capable of converting the input information data to the 2D modulation image pattern and if capable of driving the spatial modulator to thereby spatial-modulating a beam or luminous flux.

In FIG. 1 again, the light beam Lo spatial-modulated by the spatial modulator 14 passes through a half mirror 15 and is focused by an objective lens 18 to thereby be irradiated onto the holographic recording medium 100.

On the rear of the recording medium 100 (on the opposite side to the objective lens 18), there is provided a mirror 19. The light beam Lo focused by the objective lens 18 passes through the recording medium 100, is reflected by the mirror 19, and then enters the recording medium again. Therefore, the light beam which enters the medium directly from the objective lens 18 and the light beam which enters the medium after being reflected by the mirror 19 form an interference pattern in the recording medium 100. The interference pattern is recorded into the recording medium 100.

The light beam Lo which enters the recording medium 100 after being reflected by the mirror 19 is reflected by the half mirror 15 and is received by a 2D sensor 16. The 2D sensor 16 may be a CCD array, a CMOS sensor, or the like, and it outputs an electrical signal corresponding to the quantity of incident light.

On the other hand, in the information reproduction, the spatial modulator 14 is controlled in a non-modulation condition (i.e. all-optical transmission condition), under the control of the record processing circuit 20. Thus, the light beam Lo emitted from the recording/reproduction laser 11 passes through the half mirror 15 and the objective lens 18, without being modulated by the spatial modulator 14, and it is irradiated onto the recording medium 100. The light becomes reference light for reproduction. In the recording medium 100, the reference light for reproduction and the interference pattern recorded in the recording medium 100 generate detection light. The detection light passes through the objective lens 18, is reflected by the half mirror 15, and enters the 2D sensor 16. In this manner, the spatial modulation image pattern with the white and black pixels, generated by the spatial modulator 14 in the recording, is formed on the 2D sensor 16 as a reproduction image pattern. The spatial modulation image pattern is demodulated by the reproduction processing circuit 30, to thereby obtain the reproduction data corresponding to the recorded input data.

The reproduction processing circuit 30 is further provided with: a distortion correction circuit 31; and a template matching processing circuit 32.

The distortion correction circuit 31 performs distortion correction with respect to the reproduction image pattern. As a result, it specifies one page of the record data. At this time, the distortion correction circuit 31 performs, for example, geometric correction as one specific example of the distortion correction. The geometric correction means correcting a shift in pixel position between the data recording and the data reproduction.

The image is transcribed in an optical system from the spatial modulator 14 to the recording medium 100 in the recording, and from the recording medium 100 to the 2D sensor 16 in the reproduction. Since there arises a difference in magnification and distortion of the optical system, medium contraction, and the like in the recording and the reproduction, it is hardly possible to completely match the pixel position on the spatial modulator 14 in the recording and the pixel position on the 2D sensor 16 in the reproduction.

For example, if the pixel position on the spatial modulator 14 in the recording and the pixel position (i.e. the position of each light receiving element) on the 2D sensor 16 in the reproduction do not match as shown in FIG. 4(a), detection light which is to enter a particular pixel on the 2D sensor 16 possibly enters another pixel on the 2D sensor 16. More specifically, detection light which is originally to enter a first light receiving element (or first pixel) and a third light receiving element (or third pixel) on the 2D sensor 16 possibly enters each of a 0 light receiving element and a second light receiving element on the 2D sensor 16. In other words, there possibly arises a position-shift by a pixel unit. As a result, the output of the 2D sensor is not binary data to be originally expected. This makes it difficult to preferably demodulate the detection light to the original record data.

Alternatively, for example, if the pixel position on the spatial modulator 14 in the recording and the pixel position on the 2D sensor 16 in the reproduction do not match as shown in FIG. 4(b), the detection light which is originally to enter the first light receiving element and the third light receiving element on the 2D sensor 16 possibly enters either the first and second light receiving elements or the third and fourth light receiving elements on the 2D sensor 16. In other words, there possibly arises a position-shift by a sub-pixel unit. As a result, the output of the 2D sensor is not binary data to be originally expected but step-by-step multivalued data. This makes it difficult to demodulate the detection light to the original record data.

In order to prevent this situation, the distortion correction circuit 31 corrects each pixel position included in the reproduction image pattern. More specifically, on the basis of the shift between the original marker position on the spatial modulator 14 and the marker position detected in the reproduction image pattern, the distortion correction circuit 31 corrects each pixel position included in the reproduction image pattern. Thus, in the recording, under the control of the record processing circuit 20, the data is recorded in such a condition that the marker, which is a position reference of the spatial modulation image pattern, is appended to the spatial modulation image pattern. The marker is information for identifying one unit (or one page) of the record data recorded in the recording medium 100, and normally it is constructed as an image portion having a predetermined shape. The record image pattern with the marker appended in advance is recorded onto the recording medium 100.

Specifically, the marker is appended to the spatial modulation image pattern displayed on the spatial modulator 14. FIG. 5 shows one example of the spatial modulation image pattern including markers. In the example in FIG. 5, a spatial modulation image pattern 50 is displayed at a substantially center in the display area of the spatial modulator 14. Moreover, T-shape markers 52 are displayed on the outer side of the spatial modulation image pattern 50 and at the four corners in the display area of the spatial modulator 14. The spatial modulator 14 spatial-modulates the input data received from the record processing circuit 20 in the aforementioned manner, to thereby generate the spatial modulation image pattern 50, and displays it in the display area of the spatial modulator 14, as shown in FIG. 5. Moreover, the spatial modulator 14 displays the predetermined markers 52 in the predetermined positions of the display area. In this manner, as schematically shown in FIG. 5, a display image pattern 54 including the spatial modulation image pattern 50 and the markers 52 is displayed in the display area of the spatial modulator 14.

The template matching processing circuit 32 detects the position-shift of the reproduction image to perform the distortion correction with respect to the reproduction image pattern. In order to detect the position-shift, the template matching processing circuit 32 performs template matching process.

In the data reproduction, the reproduction image pattern outputted from the 2D sensor 16 has a digital value corresponding to the display image pattern 54 displayed on the spatial modulator 14 in the recording. Thus, by detecting the marker position, one page of the record data is extracted. The marker position is detected by performing the template matching process between the reproduction image pattern and an image pattern which constitutes the marker (i.e. a template image described later). FIG. 6 shows an example of the template matching process. In FIG. 6, a reproduction image pattern 61 corresponds to the display image pattern 54 displayed on the spatial modulator 14 in the recording (wherein, for convenience of explanation, only the reproduction image pattern area is shown and the content of the reproduction image pattern itself is not shown). On the other hand, a template image 62 is an image pattern corresponding to the marker 52 used in the recording. In the template matching process, as shown in FIG. 6, the template image 62 is displaced in an X direction and a Y direction on the reproduction image pattern 61, to thereby calculate the correlation value of the reproduction image pattern 61 and the template image 62. The point at which the correlation value is maximal has the coordinates of the image portion corresponding to the marker 52 on the reproduction image pattern 61.

At this time, in order to more preferably detect the coordinates of the image portion corresponding to the marker 52 on the reproduction image pattern 61, it is preferable that the reproduction image pattern 61 and the marker 52 can be clearly distinguished. In other words, preferably, the following does not occur: the marker 52 slips into and cannot be distinguished from the reproduction image pattern 61. Thus, for example, as shown in FIG. 7, there is also considered such a method that the spatial modulation image pattern 50 and markers 52 are arranged with a spatial space provided in the recording. This, however, relatively reduces a space in which the spatial modulation image pattern 50 is disposed. In other words, this increases a useless space in which neither spatial modulation image pattern 50 nor the markers 52 are disposed. As a result, this includes such a problem that a capacity for recording the data on the recording medium 100 is relatively reduced.

Therefore, the hologram recording/reproducing apparatus 1 in the embodiment clearly distinguishes the space pattern 61 and the marker 52 without reducing the capacity for recording the data onto the recording medium 100, by using the marker 52 selected in advance in accordance with a specified selection rule explained below.

Hereinafter, a marker selecting process will be explained.
(Marker Selecting Process)

Next, with reference to FIG. 8 to FIG. 16, the marker selecting process in the embodiment will be explained.

(1) Basic Structure

Firstly, with reference to FIG. 8, an explanation will be given on a basic structure for selecting the marker used on the hologram recording/reproducing apparatus in advance. FIG. 8 is a block diagram conceptually showing the basic structure for selecting the marker used on the hologram recording/reproducing apparatus in advance. Incidentally, the block diagram conceptually shows each function realized mainly on a computer. The structure shown in the block diagram may be constructed so that the aforementioned hologram recording/reproducing apparatus 1 itself has this structure. Alternatively, the structure may be constructed separately from the aforementioned hologram recording/reproducing apparatus 1.

The structure for selecting the marker (referred to as a "marker selection device 40" for convenience of explanation) is provided with: a marker generation device 41; a correlation-value calculation device 42; a comparison device 43; and a marker selection device 44, which are connected to each other by a bus 45.

The marker generation device 41 is adapted to generate the marker 52. In particular, the marker generation device 41 is adapted to generate the marker 52 according to the modulation method of modulating the input data. For example, if the input data is modulated in the 1:2 modulation method, the marker 52 is generated as a candidate corresponding to the 1:2 modulation method. If the input data is modulated in the 2:4 modulation method, the marker 52 is generated as a candidate corresponding to the 2:4 modulation method. If the input data is modulated in the 6:9 modulation method, the marker 52 is generated sequentially as a candidate corresponding to the 6:9 modulation method.

The correlation-value calculation device 42 is adapted to sequentially calculate the correlation value between the template image 62, which includes the marker 52 sequentially generated by the marker generation device 41, and the 2D modulation image pattern in which the marker 52 shifted by 0.5 pixel in each of the X direction and the Y direction is disposed in one portion. In other words, the correlation-value calculation device 42 is adapted to calculate the correlation value between the template image 62 and the 2D modulation image pattern in which the marker 52, whose position is shifted by 0.5 pixel in each of the X direction and the Y direction compared to the template image 62, is disposed in one portion. The 2D modulation image pattern follows the modulation rule of the modulation method of modulating the input data. Moreover, in one portion of the 2D modulation pattern, the 2D modulation image pattern which is most similar to the marker 52 (hereinafter referred to as a "most similar modulation pattern", as occasion demands) is disposed by accordingly arranging and combining the patterns which are modulated in accordance with the modulation rule of the modulation method of modulating the input data (refer to FIG. 10).

The comparison device 43 is adapted to sequentially compare the correlation value in the image portion of the 2D modulation image pattern in which the marker 52 shifted by 0.5 pixel is disposed, with the correlation value in the image portion of the 2D modulation image pattern in which the most similar modulation pattern is disposed, in terms of a magnitude relation.

The marker selection device 44 selects the marker 52 in the case (i.e. in the case that the correlation value in the image portion of the 2D modulation image pattern in which the marker 52 shifted by 0.5 pixel is disposed is judged to be greater than the correlation value in the image portion of the 2D modulation image pattern in which the most similar modulation pattern is disposed), as the marker 52 which can be used for the hologram recording/reproducing apparatus 1. The hologram recording/reproducing apparatus 1 uses the selected marker 52 as the marker data for the marker generator 21 in the record processing circuit 20 and also as the template data of the template matching processing circuit 32 in the reproduction processing circuit 30. In short, from the viewpoint of the hologram recording/reproducing apparatus 1, it uses the marker 52 which is selected in advance by the aforementioned structure, to thereby perform a recording operation or a reproduction operation.

(2) Operation Principle

Next, with reference to FIG. 9 to FIG. 16, the operation principle of the marker selection device 40 in the embodiment will be explained. Here, FIG. 9 is used to explain the basic operation principle of the marker selection device 40, and a more detailed explanation will be given with reference to other drawings, if necessary. FIG. 9 is a flowchart showing the outline of the operation principle of the marker selection device 40.

As shown in FIG. 9, firstly, the marker 52 is generated by the operation of the marker generation device 41 (step S101). Then, the most similar modulation pattern which is most similar to the currently generated marker 52 is generated from all the combinations of the 2D modulation image pattern, which are considered to follow the modulation rule of the modulation method of modulating the input data (step S102).

Then, the correlation value is calculated which indicates the correlation between the 2D modulation image pattern which includes the most similar modulation pattern generated in the step S102 and the template image 62 which indicates the marker 52 generated in the step S101, and its maximum correlation value P2 (or peak value) is calculated by the operation of the correlation-value calculation device 42 (step S103).

Then, the correlation value is calculated which indicates the correlation between the 2D modulation image pattern which includes the marker 52 shifted by 0.5 pixel in each of the X direction and the Y direction and the template image 62 which indicates the marker 52 generated in the step S101, and its maximum correlation value P1 (or peak value) is calculated by the operation of the correlation-value calculation device 42 (step S104).

Then, it is judged whether or not the maximum correlation value P1, calculated in the step S104, is greater than the maximum correlation value P2, calculated in the step S103, by the operation of the comparison device 43 (step S105).

As a result of the judgment, if it is judged that the maximum correlation value P1 is greater than the maximum correlation value P2 (the step S105: YES), the marker 52 generated in the step S101 is selected (or determined) as the marker 52 which can be used on the hologram recording/reproducing apparatus 1 (step S106).

On the other hand, if it is judged that the maximum correlation value P1 is not greater than the maximum correlation value P2 (the step S105: NO), the operational flow returns to the step S101 again, and the operations in the step S101 to the step S105 are repeated until the maker 52 in which the maximum correlation value P1 becomes greater than the maximum correlation value P2 is generated.

Now with reference to FIG. 10 and FIG. 11, the selection operation of selecting the marker 52 will be explained in more detail, with the specific shape or the like of the marker 52. Each of FIG. 10 and FIG. 11 are a plan view showing one specific example of the shape of the marker according to the 1:2 modulation method and a graph showing the correlation value calculated from the marker.

It is assumed that the marker 52 shown on the left side of FIG. 10(a) is generated. In this case, the correlation value between the template image 62 and the 2D modulation image pattern shown on the right side of FIG. 10(a) is calculated. The 2D modulation image pattern shown on the right side of FIG. 10(a) includes the most similar modulation pattern of the marker 52 in its upper right portion, and it includes the marker 52 shifted by 0.5 pixel in each of the X direction and the Y direction in its lower left portion. Incidentally, "shifting by 0.5 pixel" means shifting by 0.5 pixel on the basis of each light receiving element of the 2D sensor 16. In other words, it means that the detection light, which is originally to enter one light receiving element, enters the light receiving element in such a condition that the detection light is shifted by 0.5 pixel, as shown in FIG. 4(b). In the embodiment, it is intentionally realized that the detection light, which is originally to enter one light receiving element, enters the light receiving element in such a condition that the detection light is shifted by 0.5 pixel. In this case, the sensor output of the light receiving element is halved compared to an originally expected sensor output. A gray portion in FIG. 10(a) indicates a pixel portion in which the sensor output is halved because the marker 52 is shifted by 0.5 pixel.

At this time, the template image 62 which indicates the marker 52 shown on the left side of FIG. 10(a) is displaced by a pixel unit with respect to the 2D modulation image pattern shown on the right side of FIG. 10(a), to thereby calculate the correlation value. More specifically, the template image 62 is displaced from the left to the right in each of the lower portion (series 1) and the upper portion (series 2) of the 2D modulation image pattern shown on the right side of FIG. 10(a). As a result, the graph of the correlation value shown in FIG. 10(b) is obtained.

As shown in FIG. 10(b), the maximum correlation value P2 of the correlation value between the template image 62 and the 2D modulation image pattern including the most similar modulation pattern is "100." On the other hand, the maximum correlation value P1 of the correlation value between the template image 62 and the 2D modulation image pattern including the marker 52 shifted by 0.5 pixel is "109". Therefore, the marker 52 shown on the left side of FIG. 10(a) is selected as the marker 52 which can be used on the hologram recording/reproducing apparatus 1.

On the other hand, it is assumed that the marker 52 shown on the left side of FIG. 11(a) is generated. Even for this marker 52, the correlation value between the template image 62 which indicates the marker 52 shown on the left side of FIG. 11(a) and the 2D modulation image pattern shown on the right side of FIG. 11(a), which includes the most similar modulation pattern and the marker 52 shifted by 0.5 pixel, is calculated. As a result, the graph shown in FIG. 11(b) is obtained.

As shown in FIG. 11(b), the maximum correlation value P2 of the correlation value between the template image 62 and the 2D modulation image pattern including the most similar modulation pattern is "120." On the other hand, the maximum correlation value P1 of the correlation value between the template image 62 and the 2D modulation image pattern including the marker 52 shifted by 0.5 pixel is "110". Therefore, the marker 52 shown on the left side of FIG. 11(a) is not selected as the marker 52 which can be used on the hologram recording/reproducing apparatus 1. The marker 52 in a new shape is generated again, and the aforementioned operation is repeated.

Incidentally, the reason why the marker 52 is shifted by 0.5 pixel will be explained with reference to FIG. 12. FIG. 12 is a graph showing the autocorrelation value of the marker 52.

As shown in FIG. 12, the autocorrelation value of the marker 52 has a peak P0 if there is no pixel shift (i.e. if a pixel shift amount is "0" and the template image 62 and the marker 52 match by the pixel unit). The autocorrelation value is reduced by displacing the template image 62 by one pixel each time.

Now, an explanation will be given on the autocorrelation value if the pixel shift amount is "0.3 pixel", "0.5 pixel" and "0.7 pixel". The pixel shift amount herein indicates a displacement amount of the template image 62 in a positive direction, which is based on the position in which the template image 62 and the marker 52 match by the pixel unit. Therefore, if it is assumed that the position in which the template image 62 and the marker 52 match by the pixel unit is "0 pixel", the autocorrelation value when the template image 62 is in the positions of "−1+n pixel", "n pixel", "1+n pixel", and so on is calculated in the template matching process under the condition that the pixel shift amount is "n pixel".

If the pixel shift amount is "0.3 pixel", the autocorrelation value calculated by the template matching process is shown with white triangle points in FIG. 12. That is, the maximum correlation value is P1, and the autocorrelation value is distributed with P1 as the peak.

If the pixel shift amount is "0.5 pixel", the autocorrelation value calculated by the template matching is shown with white square points in FIG. 12. That is, the maximum correlation value is P2, and the autocorrelation value is distributed with P2 as the peak.

If the pixel shift amount is "0.7 pixel", the autocorrelation value calculated by the template matching is shown with white circular points in FIG. 12. In this case, the maximum correlation value P1 is obtained not in the position of "0.7 pixel" but in the position of "−1+0.7=0.3 pixel", and the autocorrelation value is distributed with P1 as the peak. That is, even if the pixel shift amount is "0.7 pixel", actually, the autocorrelation value is obtained with it distributed in the same aspect as in the pixel shift amount of "0.3 pixel". In other words, the distribution aspect of the autocorrelation value when the pixel shift amount is "n pixel" generally matches the distribution aspect of the autocorrelation value when the pixel shift amount is "1-n pixel".

Therefore, it turns out that the peak of the autocorrelation value is the lowest when the pixel shift amount is "0.5 pixel". Thus, in the aforementioned embodiment, the correlation value is calculated between the template image 62 and the 2D modulation image pattern in which the marker 52 is shifted by 0.5 pixel and disposed. That is, the marker 52 that has the correlation value greater than the correlation value between the template image 62 and the most similar modulation pattern is selected even if the correlation value between the template image 62 and the marker 52 is intentionally made the lowest.

As explained above, according to the embodiment, the marker 52 is intentionally selected such that the maximum correlation value P1 of the marker 52 shifted by 0.5 pixel is greater than the maximum correlation value P2 of the 2D modulation image pattern including the most similar modulation pattern. In other words, even if the 2D modulation image patterns, which are obtained by modulating the input data, are arranged in any positional relationship, it is possible to clearly judge where the marker 52 is in the template matching process, by using the marker 52 selected in the above manner in advance. Therefore, it is possible to clearly distinguish the marker 52 and the 2D modulation image pattern, which is obtained by modulating the input data, in the actual hologram recording or hologram reproduction. By this, it is no longer necessary to separate the marker 52 and the 2D modulation image pattern, which is obtained by modulating the input data, with a spatial space provided, to thereby preferably ensure the recording capacity for recording the input data. That is, the recording capacity of the recording medium 100 can be efficiently used.

Incidentally, in the aforementioned embodiment, the shape of the marker 52 according to the 1:2 modulation method is specifically illustrated and explained. The same is true for the marker 52 according to the 2:4 modulation method, as shown in FIG. 13 and FIG. 14. The same is also true for the marker 52 according to the 6:9 modulation method, as shown in FIG. 15 and FIG. 16. Each of FIG. 13 and FIG. 14 are a plan view showing one specific example of the shape of the marker according to the 2:4 modulation method and a graph showing the correlation value calculated by the marker. Each of FIG. 15 and FIG. 16 are a plan view showing one specific example of the shape of the marker according to the 6:9 modulation method and a graph showing the correlation value calculated by the marker.

In the case that the marker is based on the 2:4 modulation method, for example, it is assumed that the marker 52 shown on the left side of FIG. 13(a) is generated. Even for this marker 52, the correlation value between the template image 62 which indicates the marker 52 shown on the left side of FIG. 13(a) and the 2D modulation image pattern shown on the right side of FIG. 13(a) which includes the most similar modulation pattern and the marker 52 shifted by 0.5 pixel is calculated. As a result, the graph shown in FIG. 13(b) is obtained.

As shown in FIG. 13(b), the maximum correlation value P2 of the correlation value between the template image 62 and the 2D modulation image pattern including the most similar modulation pattern is "70." On the other hand, the maximum correlation value P1 of the correlation value between the template image 62 and the 2D modulation image pattern including the marker 52 shifted by 0.5 pixel is "90". Therefore, the marker 52 shown on the left side of FIG. 13(a) is selected as the marker 52 which can be used on the hologram recording/reproducing apparatus 1.

On the other hand, it is assumed that the marker 52 shown on the left side of FIG. 14(a) is generated. Even for this marker 52, the correlation value between the template image 62 which indicates the marker 52 shown on the left side of FIG. 14(a) and the 2D modulation image pattern shown on the right side of FIG. 14(a) which includes the most similar modulation pattern and the marker 52 shifted by 0.5 pixel is calculated. As a result, the graph shown in FIG. 14(b) is obtained.

As shown in FIG. 14(b), the maximum correlation value P2 of the correlation value between the template image 62 and the 2D modulation image pattern including the most similar modulation pattern is "110." On the other hand, the maximum correlation value P1 of the correlation value between the template image 62 and the 2D modulation image pattern including the marker 52 shifted by 0.5 pixel is "107". Therefore, the marker 52 shown on the left side of FIG. 14(a) is not selected as the marker 52 which can be used on the hologram recording/reproducing apparatus 1. The marker 52 in a new shape is generated again, and the aforementioned operation is repeated.

In the case that the marker is based on the 6:9 modulation method, for example, it is assumed that the marker 52 shown on the left side of FIG. 15(a) is generated. Even for this marker 52, the correlation value between the template image 62 which indicates the marker 52 shown on the left side of FIG. 15(a) and the 2D modulation image pattern shown on the right side of FIG. 15(a) which includes the most similar modulation pattern and the marker 52 shifted by 0.5 pixel is calculated. As a result, the graph shown in FIG. 15(b) is obtained.

As shown in FIG. 15(b), the maximum correlation value P2 of the correlation value between the template image 62 and the 2D modulation image pattern including the most similar modulation pattern is "90." On the other hand, the maximum correlation value P1 of the correlation value between the template image 62 and the 2D modulation image pattern including the marker 52 shifted by 0.5 pixel is "110". Therefore, the marker 52 shown on the left side of FIG. 15(a) is selected as the marker 52 which can be used on the hologram recording/reproducing apparatus 1.

On the other hand, it is assumed that the marker 52 shown on the left side of FIG. 16(a) is generated. Even for this marker 52, the correlation value between the template image 62 which indicates the marker 52 shown on the left side of FIG. 16(a) and the 2D modulation image pattern shown on the right side of FIG. 16(a) which includes the most similar modulation pattern and the marker 52 shifted by 0.5 pixel is calculated. As a result, the graph shown in FIG. 16(b) is obtained.

As shown in FIG. 16(b), the maximum correlation value P2 of the correlation value between the template image 62 and the 2D modulation image pattern including the most similar modulation pattern is "110." On the other hand, the maximum correlation value P1 of the correlation value between the template image 62 and the 2D modulation image pattern including the marker 52 shifted by 0.5 pixel is "105". Therefore, the marker 52 shown on the left side of FIG. 16(a) is not selected as the marker 52 which can be used on the hologram recording/reproducing apparatus 1. The marker 52 in a new shape is generated again, and the aforementioned operation is repeated.

Incidentally, the shape of the marker 52 in the aforementioned embodiment is merely one specific example, and it is obvious that the present invention is not limited to this example. Moreover, the modulation method and its modulation rule are also merely one specific example in the explanation in the aforementioned embodiment, and the same as the aforementioned embodiment is true even if other modulation methods and their modulation rule are used.

Moreover, the present invention is not limited to the aforementioned embodiment, and various changes may be made without departing from the essence or spirit of the invention which can be read from the claims and the entire specification. A marker generating apparatus and method, a marker, a hologram recording apparatus and method, a hologram reproducing apparatus and method, and a computer program, which involve such changes, are also intended to be within the technical scope of the present invention.

INDUSTRIAL APPLICABILITY

The marker selecting method, the marker selecting apparatus, the marker, the hologram recording apparatus and method, the hologram reproducing apparatus and method, and the computer program according to the present invention can be applied to a marker selecting method of and a marker selecting apparatus for selecting a maker which is used in hologram recording/reproduction, a marker which is used in hologram recording/reproduction, a hologram reproducing apparatus for and method of recording information onto a holographic recording medium, and hologram reproducing apparatus for and method of reproducing information from the holographic recording medium. Moreover, the computer program of the present invention or products associated with the program can be applied to the hologram recording apparatus or the hologram reproducing apparatus which is mounted on various computer equipment for consumer use or for commercial use, or which can be connected to various computer equipment.

The invention claimed is:

1. A marker selecting method comprising:
modulating information data in a two-dimensional manner in accordance with a specified modulation rule, to thereby obtain modulation data;
generating at least one first marker in accordance with the modulation rule, each first marker defining a position reference for correcting a position-shift of the modulation data in a recording/reproducing procedure;
preparing a first verification image and a second verification image and calculating a first correlation value which indicates a correlation between a template image and the first verification image and a second correlation value which indicates a correlation between the template image and the second verification image, the first verification image including a second marker having a pattern which is obtained by shifting a pattern of a generated first marker by a predetermined pixel amount, the second verification image including the modulation data, and the template image indicating the pattern of the first marker; and
selecting one of the first markers having a pattern by which a peak of the first correlation value in the first verification image is greater than a peak of the second correlation value in the second verification image.

2. The marker selecting method according to claim 1, wherein
a similar pattern which is similar to the first marker is disposed in at least one portion of the second verification image, and
said selecting selects the first marker by which the peak of the first correlation value is greater than the peak of the second correlation value in the portion of the second verification image in which the similar pattern is disposed.

3. The marker selecting method according to claim 2, wherein if the modulation rule is different, a different pattern is also generated for the similar pattern.

4. The marker selecting method according to claim 1, wherein the second marker is obtained by shifting the first marker by 0.5 pixel.

5. The marker selecting method according to claim 1, wherein the second marker is shifted by the predetermined pixel amount on the basis of a pixel unit on a light receiving element used when the modulation data is reproduced.

6. The marker selecting method according to claim 1, wherein the first verification image includes the first marker shifted by the predetermined pixel amount in each of a longitudinal direction and a lateral direction.

7. A marker selecting apparatus comprising:
a two-dimensional modulating device for modulating information data in a two-dimensional manner in accordance with a specified modulation rule, to thereby obtain modulation data;
a marker generating device for generating at least one first marker in accordance with the modulation rule, each first marker defining a position reference for correcting a position-shift of the modulation data in a recording/ reproducing procedure;
a calculating device for preparing a first verification image and a second verification image and calculating a first correlation value which indicates a correlation between a template image and the first verification image and a second correlation value which indicates a correlation between the template image and the second verification image, the first verification image including a second marker having a pattern which is obtained by shifting a pattern of a generated first marker by a predetermined pixel amount, the second verification image including the modulation data, and the template image indicating the pattern of the first marker; and
a selecting device for selecting one of the first markers having a pattern by which a peak of the first correlation value in the first verification image is greater than a peak of the second correlation value in the second verification image.

8. A hologram recording apparatus comprising:
an appending device for appending to a record image including information data a marker selected by a marker selecting apparatus which is configured to modulate the information data in a two-dimensional manner in accordance with a specified modulation rule, to thereby obtain modulation data; generate at least one first marker in accordance with the modulation rule, each first marker defining a position reference for correcting a position-shift of the modulation data in a recording/reproducing procedure; prepare a first verification image and a second verification image and calculate a first correlation value which indicates a correlation between a template image and the first verification image and a second correlation value which indicates a correlation between the template image and the second verification image, the first verification image including a second marker having a pattern which is obtained by shifting a pattern of a generated first marker by a predetermined pixel amount, the second verification image including the modulation data, and the template image indicating the pattern of the first marker; and select, as the marker for appending, one of the first markers having a pattern by which a peak of the first correlation value in the first verification image is greater than a peak of the second correlation value in the second verification image; and
a recording device for recording the record image to which the selected marker is appended, onto a holographic recording medium.

9. A hologram recording method comprising:
an appending process of appending to a record image including information data a marker selected by a marker selecting method comprising: modulating the information data in a two-dimensional manner in accordance with a specified modulation rule, to thereby obtain modulation data generating at least one first marker in accordance with the modulation rule, each first marker defining a position reference for correcting a position-shift of the modulation data in a recording/reproducing procedure; preparing a first verification image and a second verification image and calculating a first correlation value which indicates a correlation between a template image and the first verification image and a second correlation value which indicates a correlation between the template image and the second verification image, the first verification image including a second marker having a pattern which is obtained by shifting a pattern of a generated first marker by a predetermined pixel amount, the second verification image including the modulation data, and the template image indicating the pattern of the first marker; and selecting, as the marker for appending, one of the first markers having a pattern by which a peak of the first correlation value in the first verification image is greater than a peak of the second correlation value in the second verification image; and a recording process of recording the record image to which the selected marker is appended, onto a holographic recording medium.

10. A hologram reproducing apparatus comprising:

a processing device for performing a template matching process with respect to a record image including the information data recorded on a holographic recording medium by using a marker selected by a marker selecting apparatus which is configured to modulate information data in a two-dimensional manner in accordance with a specified modulation rule, to thereby obtain modulation data generate at least one first marker in accordance with the modulation rule, each first marker defining a position reference for correcting a position-shift of the modulation data in a recording/reproducing procedure; prepare a first verification image and a second verification image and calculate a first correlation value which indicates a correlation between a template image and the first verification image and a second correlation value which indicates a correlation between the template image and the second verification image, the first verification image including a second marker having a pattern which is obtained by shifting a pattern of a generated first marker by a predetermined pixel amount, the second verification image including the modulation data, and the template image indicating the pattern of the first marker; and select as the marker the first marker having a pattern by which a peak of the first correlation value in the first verification image is greater than a peak of the second correlation value in the second verification image; and a reproducing device for reproducing the information data included in the record image.

11. A hologram reproducing method comprising:

performing a template matching process with respect to a record image including information data recorded on a holographic recording medium by using a marker selected by a marker selecting method comprising: modulating information data in a two-dimensional manner in accordance with a specified modulation rule, to thereby obtain modulation data generating at least one first marker in accordance with the modulation rule, the first marker defining a position reference for correcting a position-shift of the modulation data in a recording/ reproducing procedure; preparing a first verification image and a second verification image and calculating a first correlation value which indicates a correlation between a template image and the first verification image and a second correlation value which indicates a correlation between the template image and the second verification image, the first verification image including a second marker having a pattern which is obtained by shifting a pattern of a generated first marker by a predetermined pixel amount, the second verification image including the modulation data, and the template image indicating the pattern of the first marker; and selecting as the marker one of the first markers having a pattern by which a peak of the first correlation value in the first verification image is greater than a peak of the second correlation value in the second verification image; and reproducing the information data included in the record image.

12. A computer program product in a computer-readable medium for tangibly embodying a program of instructions executable by a computer provided in a hologram recording apparatus, the computer program making the computer function as at least one portion of an appending device and a recording device of said hologram recording apparatus, said appending device for appending to a record image of information data a marker selected by a marker selecting apparatus configured to modulate the information data in a two-dimensional manner in accordance with a specified modulation rule, to thereby obtain modulation data; generate at least one first marker in accordance with the modulation rule, each first marker defining a position reference for correcting a position-shift of the modulation data in a recording/reproducing procedure; prepare a first verification image and a second verification image and calculate a first correlation value which indicates a correlation between a template image and the first verification image and a second correlation value which indicates a correlation between the template image and the second verification image, the first verification image including a second marker having a pattern which is obtained by shifting a pattern of a generated first marker by a predetermined pixel amount, the second verification image including the modulation data, and the template image indicating the pattern of the first marker; and select, as the marker for appending, one of the first markers having a pattern by which a peak of the first correlation value in the first verification image is greater than a peak of the second correlation value in the second verification image; and said recording device for recording the record image to which the selected marker is appended, onto a holographic recording medium.

13. A computer program product in a computer-readable medium for tangibly embodying a program of instructions executable by a computer provided in a hologram reproducing apparatus, the computer program making the computer function as at least one portion of a processing device and a reproducing device of said hologram reproducing apparatus, said processing device for performing a template matching process with respect to a record image including the information data recorded on a holographic recording medium by using a marker selected by a marker selecting apparatus configured to modulate the information data in a two-dimensional manner in accordance with a specified modulation rule, to thereby obtain modulation data; generate at least one first marker in accordance with the modulation rule, each first marker defining a position reference for correcting a position-shift of the modulation data in a recording/reproducing procedure; prepare a first verification image and a second verification image and calculate a first correlation value which indicates a correlation between a template image and the first verification image and a second correlation value which indicates a correlation between the template image and the second verification image, the first verification image including a second marker having a pattern which is obtained by shifting a pattern of a generated first marker by a predetermined pixel amount, the second verification image including the modulation data, and the template image indicating the pattern of the first marker; and select as the marker one of the first markers having a pattern by which a peak of the first correlation value in the first verification image is greater than a peak of the second correlation value in the second verification image; and a reproducing device for reproducing the information data included in the record image.

* * * * *